United States Patent
Ito et al.

(10) Patent No.: US 7,374,710 B2
(45) Date of Patent: May 20, 2008

(54) INSERT MOLDING APPARATUS AND INSERT MOLDING METHOD

(75) Inventors: Naoyuki Ito, Toyoake (JP); Tamiya Sakaguchi, Kariya (JP); Hiroshi Tanimura, Kariya (JP); Naoki Hiraiwa, Toyokawa (JP); Tsuyoshi Arai, Kariya (JP)

(73) Assignee: Denso Corporation (JP)

( * ) Notice: Subject to any disclaimer, the term of this patent is extended or adjusted under 35 U.S.C. 154(b) by 343 days.

(21) Appl. No.: 11/212,117

(22) Filed: Aug. 26, 2005

(65) Prior Publication Data

US 2006/0045931 A1 Mar. 2, 2006

(30) Foreign Application Priority Data

Aug. 27, 2004 (JP) ............................. 2004-248791
Aug. 27, 2004 (JP) ............................. 2004-248792

(51) Int. Cl.
*B29C 45/14* (2006.01)

(52) U.S. Cl. .................................... 264/263; 425/126.1

(58) Field of Classification Search ............. 425/126.1; 264/263
See application file for complete search history.

(56) References Cited

U.S. PATENT DOCUMENTS

| 3,303,256 | A | * | 2/1967 | Morin ......................... 264/275 |
| 4,231,985 | A | * | 11/1980 | McElheny .................... 264/262 |
| 4,334,846 | A | * | 6/1982 | Boniface et al. .......... 425/126.1 |
| 4,443,173 | A | * | 4/1984 | Mansberger, II .......... 425/126.1 |
| 4,740,347 | A | * | 4/1988 | Sloan et al. ................. 264/262 |

FOREIGN PATENT DOCUMENTS

| JP | 2004-098323 | 4/2004 |
| WO | 02/062551 | 8/2002 |

* cited by examiner

*Primary Examiner*—Robert B Davis
(74) *Attorney, Agent, or Firm*—Nixon & Vanderhye PC

(57) ABSTRACT

A die arrangement has a die cavity. An insert is fed into the die cavity in advance of injection of a molding material into the die cavity after initiation of a die closing drive operation of the die arrangement.

19 Claims, 30 Drawing Sheets

INSERT MOLDING APPARATUS AND INSERT MOLDING METHOD

CROSS REFERENCE TO RELATED APPLICATION

This application is based on and incorporates herein by reference Japanese Patent Application No. 2004-248791 filed on Aug. 27, 2004 and Japanese Patent Application No. 2004-248792 filed on Aug. 27, 2004.

BACKGROUND OF THE INVENTION

1. Field of the Invention

The present invention relates to an insert molding apparatus and an insert molding method using the same.

2. Description of Related Art

An insert molding for molding a product upon placing an insert in a cavity formed in a die arrangement is previously known (see, for example, Japanese Unexamined Patent Publication No. 2004-98323).

At the time of transferring and setting the insert in a cavity defining portion of the opened die arrangement, a human intervention by hands or a separate transferring apparatus other than the molding apparatus is used.

In the case of transferring the insert by the hands or the separate transferring apparatus, the transferring of the insert and the driving of the die arrangement are performed separately. Thus, the production efficiency is relatively low. Furthermore, in the case where the insert is transferred by the human hands or the transferring apparatus, a die closing drive operation for closing the die arrangement needs to be suspended until the end of the transferring of the insert. In order to avoid critical intervention between the human or the transferring apparatus and the die arrangement, the waiting time should be sufficiently lengthened. However, this normally results in a reduced production efficiency. Furthermore, in the case where the insert is transferred by the hands, the labor costs are increased. Also, in the case where the insert is transferred by the transferring apparatus, it is required to construct a system for controlling the operational timing of the transferring apparatus and the operational timing of the molding apparatus. Thus, in any of these cases, the costs are increased.

Additionally, in the case where the insert is set in the die arrangement, which is held in the open state, the setting position of the insert could be deviated at the time of die closing drive operation of the die arrangement after the setting of the insert. This could result in a damage of the die arrangement or a reduction in the product quality.

Also, DE10105526A1 discloses insert molding, in which a composite insert is received in a cavity of a die arrangement of a molding apparatus. Here, the composite insert is made in such a manner that journal portions of a second insert are received in holes of a first insert.

In the above insert molding, the journal portions of the second insert are received in the holes of the first insert. Thus, a human intervention by hands or a separate assembling apparatus other than the molding apparatus is required to insert the journal portions of the second insert into the holes of the first insert. Furthermore, at the time of transferring and setting the assembled composite insert in a cavity defining portion of the opened die arrangement, a human intervention by hands or a separate transferring apparatus other than the molding apparatus is used.

In the case where the assembling and transferring of the composite insert are performed by the human hands, the work time for assembling and transferring the composite insert is additionally required, thereby causing an increase in the labor cost. Furthermore, in the case where the composite insert is transferred by the human hands, a die closing drive operation for closing the die arrangement needs to be suspended until the end of the transferring of the composite insert. In order to avoid critical intervention between the human and the die arrangement, the waiting time should be sufficiently lengthened. However, this normally results in a reduced production efficiency.

Furthermore, when the assembling of the composite insert, the transferring of the composite insert and the insert molding are performed by separate apparatuses, respectively, the composite insert needs to be transferred between the apparatuses. This results in reduced production efficiency. Also, when the transferring of the composite insert between the apparatuses is automated, it will result in an increase in the costs. Furthermore, in the case where the composite insert is transferred by a dedicated transferring apparatus, the die closing drive of operation of the die arrangement needs to be lengthened to avoid any critical intervention between the transferring apparatus and the die arrangement. This normally results in the reduced production efficiency.

Furthermore, in the case where the composite insert is set in the die arrangement, which is held in the open state, the setting position of the composite insert could be deviated at the time of die closing drive operation of the die arrangement after the setting of the composite insert. This could result in a damage of the die arrangement or a reduction in the product quality.

SUMMARY OF THE INVENTION

The present invention addresses the above disadvantages. Thus, it is an objective of the present invention to provide an insert molding apparatus and an insert molding method, which improve production efficiency and reduce costs.

It is another objective of the present invention to provide an insert molding apparatus and an insert molding method, which improve a product quality.

To achieve the objectives of the present invention, there is provided an insert molding apparatus for molding a product having an insert embedded therein. The insert molding apparatus includes a die drive means, a die arrangement and a supply means. The die arrangement is driven by the die drive means to open and close the die arrangement and includes a plurality of die bodies. At least two of the plurality of die bodies are engageable with one another through a die closing drive operation of the die arrangement by the die drive means and are disengageable from one another through a die opening drive operation of the die arrangement by the die drive means. The at least two of the plurality of die bodies cooperate together to define a die cavity for receiving the insert and for molding the product when the at least two of the plurality of die bodies are engaged with one another. The supply means is for supplying the insert into the die cavity in advance of injection of a molding material into the die cavity after initiation of the die closing drive operation of the die arrangement.

The insert may be a complex insert that includes a first type insert element and a second type insert element. The first type insert element has a hole. The second type insert element has a journal portion, which is inserted into the hole of the first type insert element. The supply means may include a straight hole, a first urging means and a second urging means. The straight hole is defined by one or more of the plurality of die bodies and is communicated with the die cavity. The first urging means is for urging the first type insert element, which is fed to the straight hole in such a manner that the hole of the first type insert element is coaxial with the straight hole, so that the first type insert element is driven to the die cavity by the first urging means. The second urging means is for urging the second type insert element, which is fed to the straight hole in such a manner that the journal portion of the second type insert element is coaxial with the straight hole, so that the second type insert element is driven to the die cavity by the second urging means.

One of the plurality of die bodies other than the at least two of the plurality of die bodies may serve as a first die body. One of the at least two of the plurality of die bodies may serve as a second die body. The first die body and the second die body are engageable with each other through the die closing drive operation of the die arrangement and are disengageable from each other through the die opening drive operation of the die arrangement. The supply means may include a through hole, which is formed in the second die body, and a pusher formed in the first die body. The through hole extends through the second die body in a relative moving direction of the first die body relative to the second die body and communicates between the die cavity and a die engaging surface of the second die body, which engages a die engaging surface of the first die body upon the die closing drive operation of the die arrangement. The pusher protrudes from the die engaging surface of the first die body toward the second die body and urges the insert fed into the through hole of the second die body to the die cavity in the die closing drive operation of the die arrangement.

To achieve the objectives of the present invention there is further provided an insert molding method for molding a product having an insert embedded therein. According to the method, the insert is supplied into a die cavity of a die arrangement after initiation of a die closing drive operation of the die arrangement. Then, a molding material is injected into the die cavity after completion of the die closing drive operation of the die arrangement.

The supplying of the insert into the die cavity may include urging a first type insert element of the insert by a first urging means, so that the first type insert element is positioned in the die cavity. The supplying of the insert into the die cavity may further include urging a second type insert element of the insert by a second urging means, so that a journal portion of the second type insert element is inserted into a hole of the first type insert element previously positioned in the die cavity by the first urging means.

Alternatively, the supplying of the insert into the die cavity may include urging a second type insert element of the insert by a second urging means, so that the second type insert element is positioned in the die cavity. The supplying of the insert into the die cavity may further include urging a first type insert element of the insert by a first urging means, so that a hole of the first type insert element receives a journal portion of the second type insert element previously positioned in the die cavity by the second urging means.

Alternatively, the supplying of the insert into the die cavity may include urging the insert, which is fed to a through hole of a die body of the die arrangement, by a pusher in a relative moving direction of the pusher through a die closing drive operation of the die arrangement by a die drive means, so that the insert is positioned in the die cavity.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
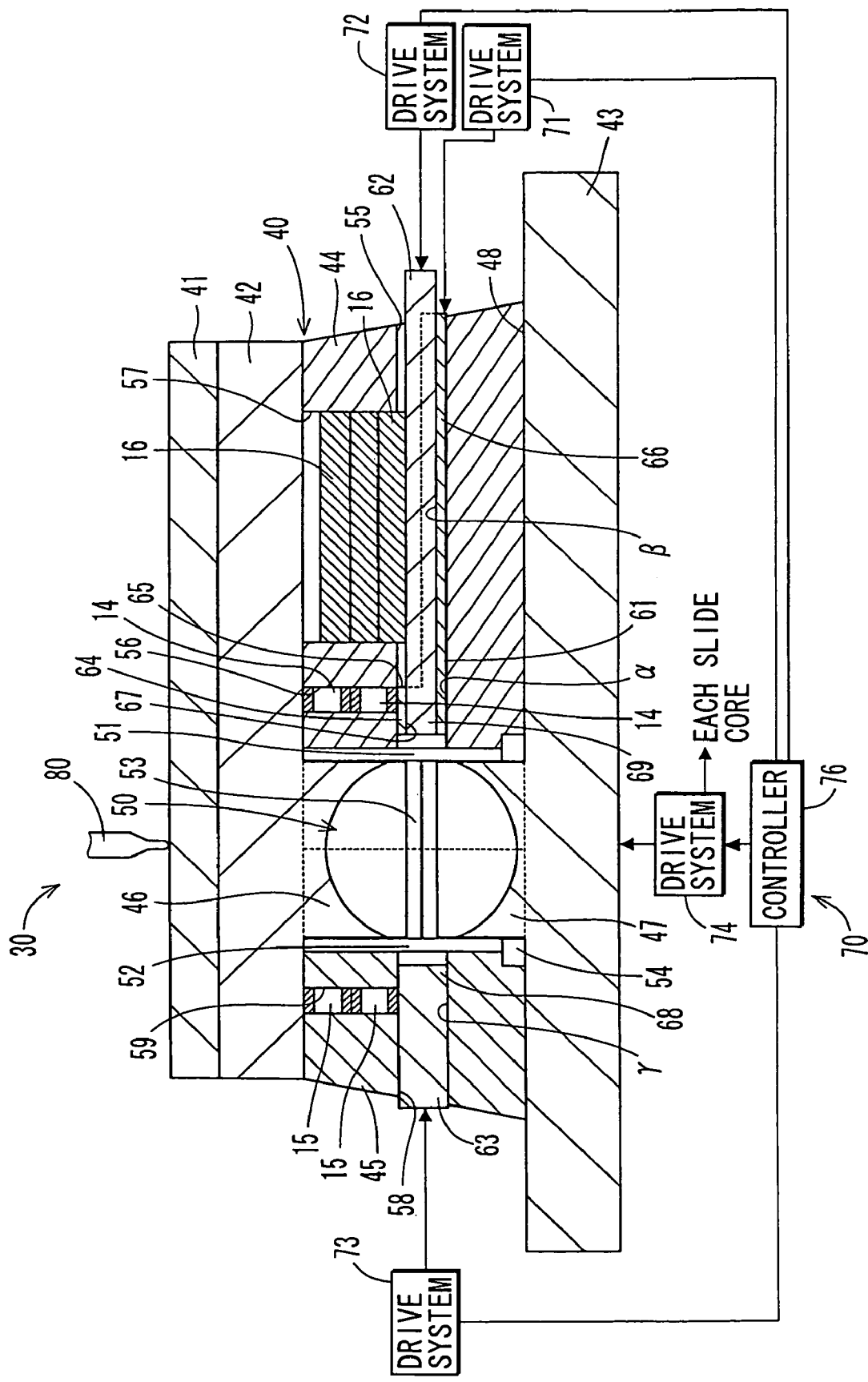
FIG. 1 is a cross sectional view of an insert molding apparatus according to a first embodiment of the present invention.

Various embodiments of the present invention will be described with reference to the accompanying drawings.

First Embodiment

A first embodiment of the present invention will be described with reference to FIGS. 1 to 7. FIG. 2 shows a throttle device 10, which serves as an insert molded product that is molded according to a first embodiment of the present invention. The throttle device 10 is installed in a vehicle to control an intake air flow rate of an internal combustion engine.

The throttle device 10 includes a body 12, bearings (serving as first type insert elements) 14, 15, a shaft (serving as a second type insert element) 16 and a valve body 18. The body 12 is formed into a cylindrical tubular body made of a resin material, and an air intake passage 20 is formed in the body 12. The bearings 14, 15 are embedded in the body 12 in the following manner. That is, the air intake passage 20 is located between the bearings 14, 15, so that the bearings 14, 15 oppose each other in a radial direction of the air intake passage 20. The bearings 14, 15 have the same shape and are coaxially arranged. Specifically, each bearing 14, 15 is formed into a cylindrical tubular body that is made of a metal material, and a hole 22, 23 axially penetrates through the bearing 14, 15. The bearings 14, 15 rotatably support opposed end journal portions 24, 25 of the shaft 16 that is formed as a metal cylindrical solid bar. With this construction, the shaft 16 extends across the air intake passage 20 in a direction perpendicular to a longitudinal axis of the body 12. An intermediate portion 26 of the shaft 16, which is positioned in the air intake passage 20, is embedded in the valve body 18. The valve body 18 is formed into a circular disk shaped resin body. The valve body 18 is integrated with the shaft 16 in such a manner that a radial direction of the valve body 18 coincides with an axial direction of the shaft 16, and the valve body 18 rotates forward and backward together with the shaft 16. A size of a clearance, which is defined between an outer peripheral edge of the valve body 18 and a bore inner wall portion of the body 12, changes in consistency with a rotational angle of the shaft 16. Due to the change in the size of the clearance, the flow rate of intake air supplied to the internal combustion engine is adjusted.

Figure 2:
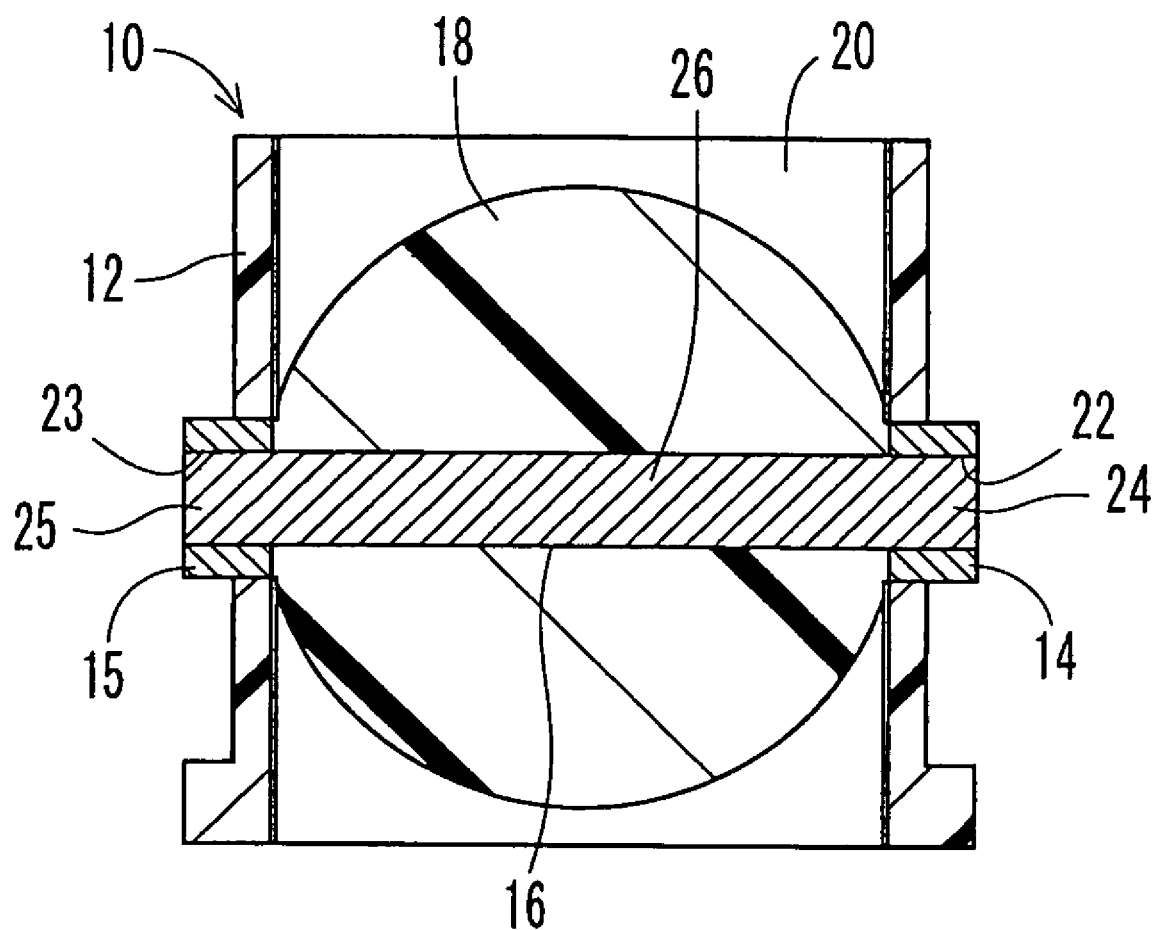
FIG. 2 is a cross sectional view showing a throttle device serving as an insert molded product of the first embodiment.

FIG. 1 shows an insert molding apparatus 30, which is used to mold the throttle device 10. In FIG. 1, a top-bottom direction and a right-left direction correspond to a vertical direction and a horizontal direction, respectively, of the insert molding apparatus 30.

The insert molding apparatus 30 includes a die arrangement 40, pushers 61-63, a drive device 70 and an injection device 80. The drive device 70 drives the above elements 40, 61-63, and the injection device 80 injects a molding material into the die arrangement 40.

The die arrangement 40 includes plates 41-43 and slide cores 44, 45, which serve as die bodies of the present invention that are engaged with one another in a manner shown in FIG. 1.

The first plate 41 is positioned and is held stationary in such a manner that the second plate 42 is clampable between the first plate 41 and the third plate 43 in the vertical direction. The second plate 42 is movable toward and away from the first plate 41, and the third plate 43 is movable toward and away from the second plate 42.

The first slide core 44 and the second slide core 45 are arranged in such a manner that a cavity defining portion 46 of the second plate 42 and a cavity defining portion 47 of the third plate 43 are clampable between the first slide core 44 and the second slide core 45 in the horizontal direction. The first slide core 44 is arranged on the upper guide surface 48 of the third plate 48 and is slidable generally in the horizontal direction. The slide core 45 is arranged on a guide surface 48 of the third plate 43 and is slidable generally in the horizontal direction. The slide cores 44, 45 and the cavity defining portions 46, 47 of the plates 42, 43 cooperate together to define a cavity 50 in a fully closed state of the die arrangement 40 shown in FIG. 1. The cavity 50 includes a first receiving portion 51, a second receiving portion 52 and a molding portion 54. The first receiving portion 51 receives the bearing 14 and the journal portion 24 of the shaft 16. The second receiving portion 52 receives the bearing 15 and the journal portion 25 of the shaft 16. The molding portion 54 is provided to mold the body 12.

A first through hole 55 linearly penetrates through the first slide core 44 generally in the horizontal direction. The first through hole 55 is a cylindrical hole, which has a circular cross section in a plane perpendicular to an axial direction of the first through hole 55. An inner diameter of the first through hole 55 is set to allow coaxial insertion of the cylindrical pusher 61 and the bearing 14 into the first through hole 55. The first through hole 55 communicates between the first receiving portion 51 of the cavity 50 and an outer wall surface of the first slide core 44.

Figure 3:
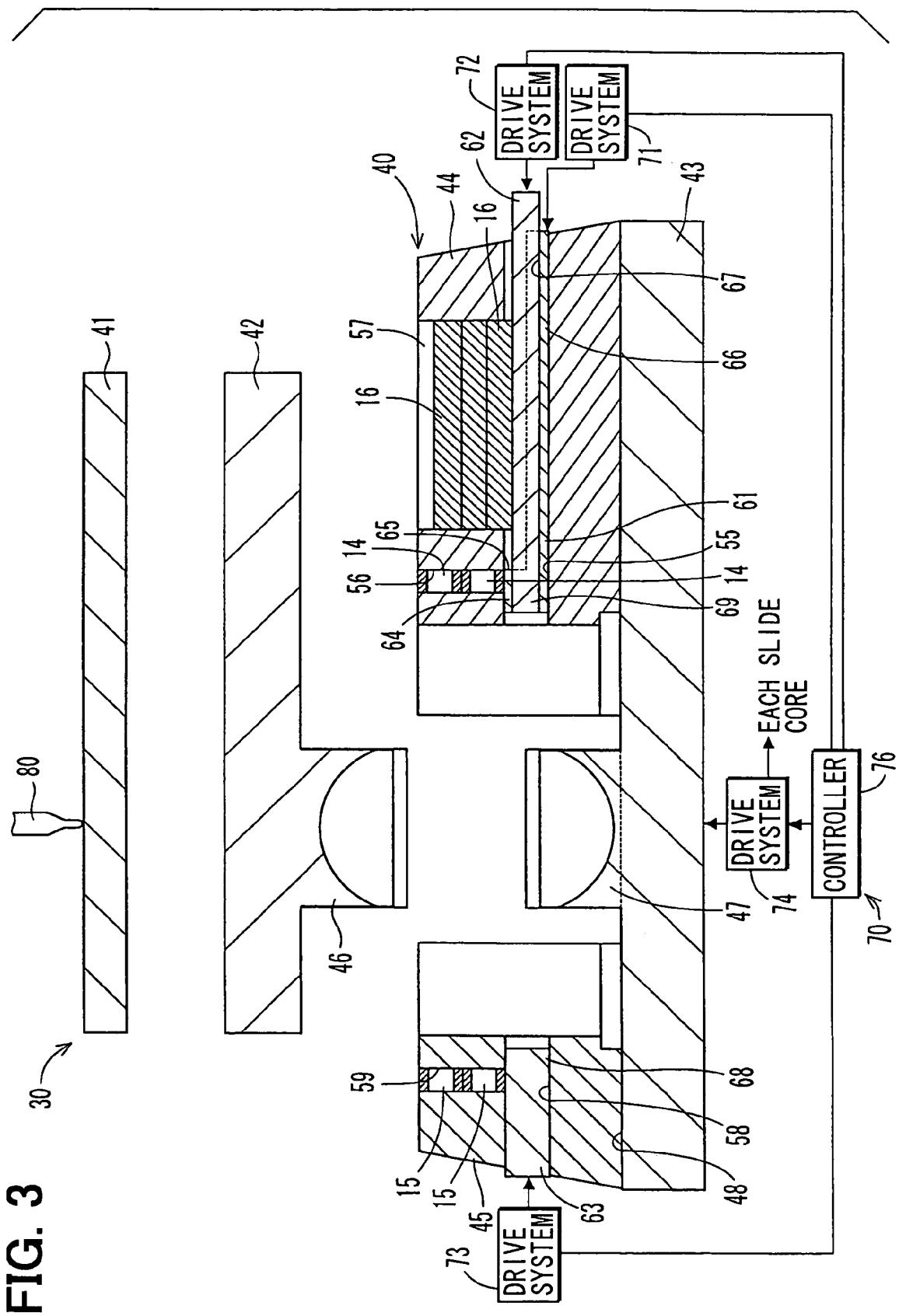
FIG. 3 is a cross sectional view of the insert molding apparatus of the first embodiment.
Figure 4:
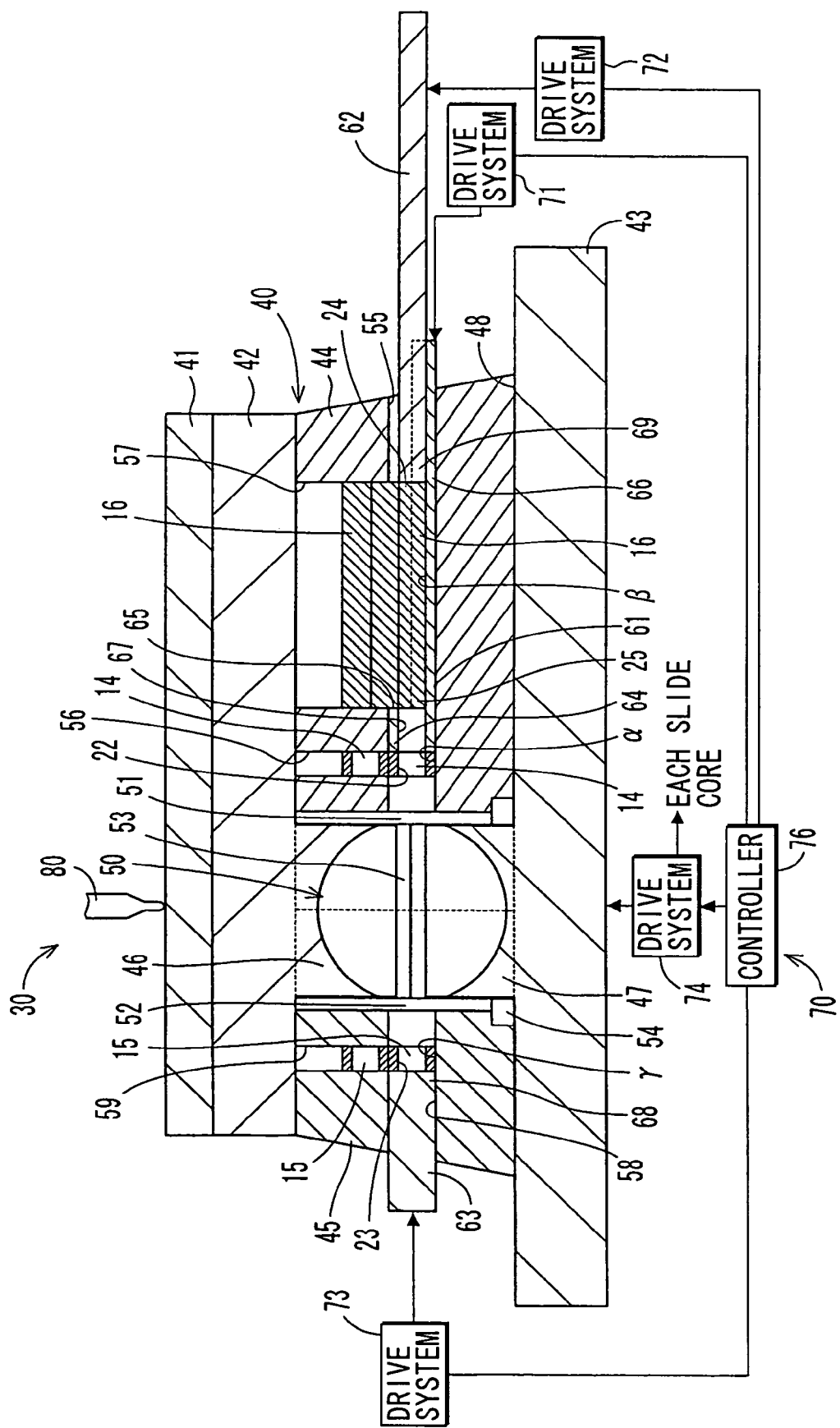
FIG. 4 is a cross sectional view of the insert molding apparatus of the first embodiment.

A first feed hole 56 linearly penetrates through the first slide core 44 generally in the vertical direction. The first feed hole 56 has a rectangular cross section in a plane perpendicular to an axial direction of the first feed hole 56. An inner size of the first feed hole 56 is set to allow insertion of the bearing 14 into the first feed hole 56 in such a manner that a radial direction and an axial direction of the bearing 14 generally coincide with the vertical direction and the horizontal direction, respectively. The first feed hole 56 has an axial length, which is several times (two times in this particular embodiment) greater than an outer diameter of the bearing 14. The first feed hole 56 communicates between a first feed position α of the first through hole 55 and a die engaging surface of the first slide core 44, which engages the second plate 42. The first feed position a is spaced a predetermined distance from the first receiving portion 51 in the axial direction of the first through hole 55. As shown in FIG. 3, in a fully opened state of the die arrangement 40, the bearings 14 can be fed into the first feed hole 56 from the second plate 42 side. The bearing 14 are aligned one after another generally in the vertical direction in the first feed hole 56 and are held and guided by the inner wall of the first feed hole 56. As shown in FIG. 4, the lowest bearing 14, which has reached the lower end of the first feed hole 56 connected to the first through hole 55, is automatically fed to the first feed position α by the gravity as soon as an obstacle immediately below the lowest bearing 14 is removed to provide an empty space for accommodating the bearing 14.

In the first slide core 44, a second feed hole 57 is spaced from the first feed hole 56 generally in the horizontal direction and linearly penetrates through the first slide core 44 generally in the vertical direction. The second feed hole 57 has a rectangular cross section in a plane perpendicular to an axial direction of the second feed hole 57. An inner size of the second feed hole 57 is set to allow insertion of the shaft 16 into the second feed hole 57 in such a manner that a radial direction and an axial direction of the shaft 16 generally coincide with the vertical direction and the horizontal direction, respectively. The second feed hole 57 has an axial length, which is generally the same as the axial length of the first feed hole 56. The second feed hole 57 communicates between a second feed position β of the first through hole 55 and the die engaging surface of the first slide core 44, which engages the second plate 42. The second feed position β is spaced a predetermined distance from the first receiving portion 51 of the cavity 50 in the axial direction of the first through hole 55 in such a manner that the second feed position β is further away from the first receiving portion 51 with respect to the first feed hole 56 (or the first feed position α). In the fully opened state of the die arrangement 40 shown in FIG. 3, the shafts 16 can be fed into the second feed hole 57 from the second plate 42 side. The shafts 16 are aligned one after another generally in the vertical direction in the second feed hole 57 and are held and guided by the inner wall of the second feed hole 57. As shown in FIG. 4, the lowest shaft 16, which has reached the lower end of the second feed hole 57 connected to the first through hole 55, is automatically fed to the second feed position β by the gravity as soon as an obstacle immediately below the lowest shaft 16 is removed to provide an empty space for accommodating the shaft 16.

A second through hole 58 linearly penetrates through the second slide core 45 generally in the horizontal direction in such a manner that the second through hole 58 is arranged coaxial with the first through hole 55. In the present embodiment, the second through hole 58 and the first through hole 55 cooperate together to form a straight hole in cooperation with the cavity 50. The second through hole 58 is a cylindrical hole, which has a circular cross section in a plane perpendicular to an axial direction of the second through hole 58. An inner diameter of the second through hole 58 is set to allow coaxial insertion of the cylindrical third pusher 63 and the bearing 15 into the second through hole 58. The second through hole 58 communicates between the second receiving portion 52 of the cavity 50 and an outer wall surface of the second slide core 45.

The first through hole 55 serves as a first hole segment, and the second through hole 58 servers as a second hole segment.

A third feed hole 59 linearly penetrates through the second slide core 45 generally in the vertical direction. The third feed hole 59 has a structure, which is generally the same as that of the first feed hole 56. The third feed hole 59 has an inner size, which allows insertion of the bearings 15 into the third feed hole 59. The third feed hole 59 communicates between a third feed position y of the second through hole 58 and a die engaging surface of the second slide core 45, which engages the second plate 42. The third feed position y is spaced a predetermined distance from the second receiving portion 52 in the axial direction of the second through hole 58. Thus, in the fully opened state of the die arrangement 40 shown in FIG. 3, the bearings 15 are aligned one after another generally in the vertical direction in the third feed hole 59 and are held and guided by the inner wall of the third feed hole 59. As shown in FIG. 4, the lowest bearing 15, which has reached the lower end of the third feed hole 59 connected to the second through hole 58, is automatically fed to the third feed position y by the gravity as soon as an obstacle immediately below the lowest bearing 15 is removed to provide an empty space for accommodating the bearing 15.

The first pusher 61 is formed as a metal cylindrical tubular bar, which extends linearly in the axial direction. An outer diameter of the first pusher 61 is generally the same as that of the bearing 14, and an inner diameter of the first pusher 61 is set to allow coaxial insertion of the shaft 16 and the second pusher 62 into the first pusher 61. The first pusher 61 is coaxially received in the first through hole 55 and is reciprocably slidable in the axial direction. The first pusher 61 is driven by a first drive system 71 of the drive device 70, so that the first pusher 61 is moved forward toward or is moved backward away from the first receiving portion 51.

An upper half of the first pusher 61 is removed to form a window 65 in a rear side of the first pusher 61, which is located on a backward side (right side in FIG. 4) of a distal end portion 64 that has the upper half. As shown in FIGS. 1 and 4, the window 65 of the first pusher 61 opens the space immediately below the second feed hole 57 when the first pusher 61 is moved to a specific position. Specifically, when the first pusher 61 is placed in a backward end position (right end position in FIG. 4), the window 65 of the first pusher 61 opens the space immediately below the second feed hole 57, so that feeding of the shaft 16 to the second feed position β is permitted. The shaft 16, which is fed to the second feed position β, is supported by an inner wall of a semi-tubular portion 66 of the first pusher 61, which is radially opposed to the window 65 in the first pusher 61. Thus, the entire shaft 16, which includes the journal portions 24, 25, is arranged coaxial to the first through hole 55. In the backward end position of the first pusher 61, the distal end portion 64 of the first pusher 61 is located on the backward side (right side in FIG. 4) of the first feed position α, so that the space immediately below the first feed hole 56 is opened to permit feeding of the bearing 14 to the first feed position α. The bearing 14, which is fed to the first feed position α, is supported by the inner wall of the first through hole 55, which is opposed to the first feed hole 56. Thus, the bearing 14 and its hole 22 are positioned entirely coaxial to the first through hole 55. In predetermined positions of the first pusher 61, such as the forward end position (FIG. 1), which are other than the backward end position of the first pusher 61, the distal end portion 64 of the first pusher 61 partially or entirely coves the lower end of the first feed hole 56, so that feeding of the bearing 14 to the first feed position α is prevented.

The second pusher 62 is formed as a metal cylindrical solid bar, which extends linearly in the axial direction. An outer diameter of the second pusher 62 is generally the same as that of the shaft 16. The second pusher 62 is coaxially received in an inner hole 67 of the first pusher 61 and is reciprocably slidable in the axial direction. The second pusher 62 is driven by a second drive system 72 of the drive device 70, so that the second pusher 62 is moved forward toward or is moved backward away from the first receiving portion 51. In the backward end position of the second pusher 62 shown in FIG. 4, the second pusher 62 is located on a backward side of the second feed position β and opens the space immediately below the second feed hole 57. Thus, feeding of the shaft 16 to the second feed position β through the window 65 of the first pusher 61 is permitted. In predetermined positions of the second pusher 62, such as the forward end position (FIG. 1), which are other than the backward end position of the second pusher 62, the second pusher 62 is located immediately below the second feed hole 57. Thus, feeding of the shaft 16 to the second feed position β is prevented.

The third pusher 63 is formed as a metal cylindrical solid bar, which extends linearly in the axial direction. An outer diameter of the third pusher 63 is generally the same as that of the bearing 15. The third pusher 63 is coaxially received in the second through hole 58 and is reciprocably slidable in the axial direction. The third pusher 63 is driven by a third drive system 73 of the drive device 70, so that the third pusher 63 is moved forward toward or is moved backward away from the second receiving portion 52. In the backward end position of the third pusher 63 shown in FIG. 4, the third pusher 63 is located on a backward side of the third feed position γ and opens the space immediately below the third feed hole 59. Thus, feeding of the bearing 15 to the third feed position γ is permitted. In predetermined positions of the third pusher 63, such as the forward end position (FIG. 1), which are other than the backward end position of the third pusher 63, the third pusher 63 partially or entirely covers the lower end of the third feed hole 59, so that feeding of the bearing 15 to the third feed position γ is prevented.

The drive device (die drive means) 70 includes the drive systems 71-74 and a controller 76. The first to third drive systems 71-73 provide the axial drive force to the first to third pushers 61-63, respectively, so that the pushers 61-63 are moved forward and backward. The fourth drive system 74 directly provides the drive force to the third plate 43 generally in the vertical direction and thereby indirectly provides the drive force to the second plate 42 generally in the vertical direction, so that the third and second plates 43, 42 are driven. The fourth drive system 74 also provides the drive force to the first and second slide cores 44, 45 generally in the horizontal direction, so that the first and second slide cores 44, 45 are individually driven. The controller 76 includes an electric circuit, such as a microcomputer, and is electrically connected to the first to fourth drive systems 71-74. The controller 76 controls operations of the first to third drive systems 71-73 to control the forward movement and the backward movement of the first to third pushers 61-63. Furthermore, the controller 76 controls the operation of the fourth drive system 74 to control the die opening drive operation and the die closing drive operation of the die arrangement 40.

The first pusher 61 and the first drive system 71 correspond to a first urging means, and the third pusher 63 and the third drive system 73 correspond to another type of first urging means. The first pusher 61 corresponds to a first type urging member, and the third pusher 63 corresponds to another first type urging member. The second pusher 62 and the second drive system 72 correspond to a second urging means, and the second pusher 62 corresponds to a second type urging member. Furthermore, the first to third feed holes 56, 57, 59 correspond to a feed means. The first feed hole 56 corresponds to a first type holding hole, and the third feed hole 59 corresponds to another first type holding hole. The second feed hole 57 corresponds to a second type holding hole.

The injection device 80 injects the molding material into the die arrangement 40 through the control operation of the controller 76, which is electrically connected to the injection device 80. The injected molding material is filled into the cavity 50 through a runner and a gate (not shown), which are formed in the plates 41, 42. The molding material may include a molten resin material, a molten metal material and/or the like.

Next, the operation of the insert molding apparatus 30 will be described.

In the fully opened state of the die arrangement 40 shown in FIG. 3, each of the first to third pushers 61-63 is placed in its forward end position. In the fully opened state of the die arrangement 40, when the bearings 14, 15 and the shafts 16 are supplied to the feed holes 56, 59, 57, the controller 76 drives the fourth drive system 74 to close the die arrangement 40. The controller 76 performs it automatically or upon receiving a corresponding command from an operator. Through this die closing drive operation, the plates 41-43 and the slide cores 44, 45 are closed, as shown in FIG. 1.

Upon completion of the die closing drive operation of the die arrangement 40, the controller 76 drives the first to third drive systems 71-73 to move the first to third pushers 61-63 in its backward direction. When each pusher 61-63 reaches its backward end position due to the backward drive operation of the pusher 61-63, the space immediately below the corresponding one of the first to third feed holes 56, 57, 59 is opened, so that the corresponding one of the bearing 14, the shaft 16 and the bearing 15 is automatically fed to the corresponding feed position α-γ. Here, it should be noted that the first to third pushers 61-63 may be simultaneously moved in the backward direction at once, or alternatively, the first to third pushers 61-63 may be sequentially moved in the backward direction.

Figure 5:
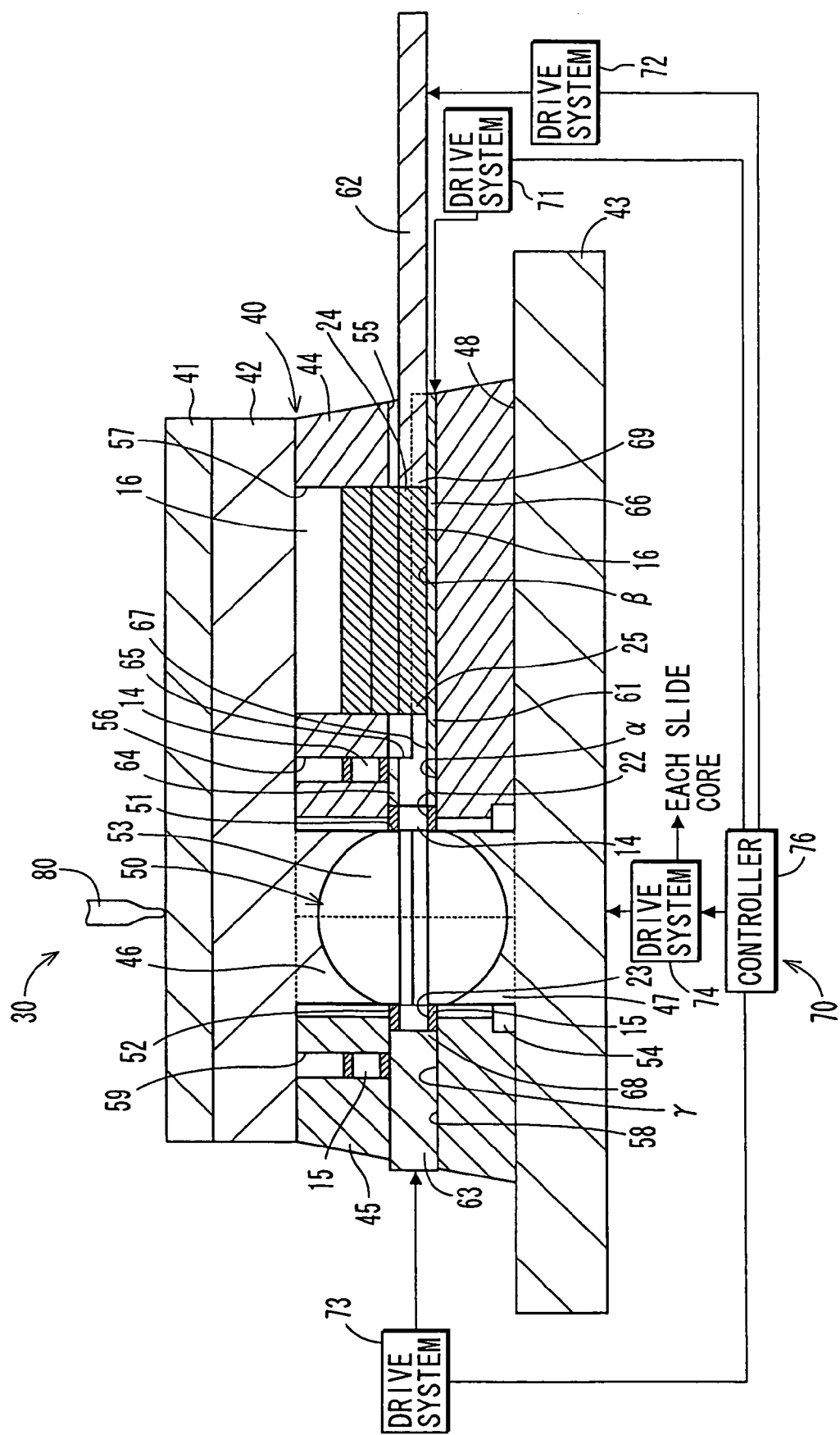
FIG. 5 is a cross sectional view of the insert molding apparatus of the first embodiment.

When the backward drive operation of the first to third pushers 61-63 completes, the controller 76 controls the first and third drive systems 71, 73 to drive the first and third pushers 61, 63 in its forward direction. Due to the forward drive operation of the first pusher 61, the distal end portion 64 of the first pusher 61 engages the bearing 14 located in the first feed position α and pushes the bearing 14 toward the first receiving portion 51 in the axial direction of the hole 22 of the bearing 14. As a result, the bearing 14, which receives the urging force from the distal end portion 64 of the first pusher 61, is slid in the first through hole 55 and is then received in the first receiving portion 51, as shown in FIG. 5. The bearing 14, which is received in the first receiving portion 51, is positioned and is held between the distal end portion 64 of the first pusher 61 and the cavity defining portions 46, 47 of the plates 42, 43. Due to the forward drive operation of the third pusher 63, the distal end portion 68 of the third pusher 63 engages the bearing 15 located in the third feed position γ and pushes the bearing 15 toward the second receiving portion 52 in the axial direction of the hole 23 of the bearing 15. As a result, the bearing 15, which receives the urging force from the distal end portion 68 of the third pusher 63, is slid in the second through hole 58 and is then received in the second receiving portion 52, as shown in FIG. 5. The bearing 15, which is received in the second receiving portion 52, is positioned and is held between the distal end portion 68 of the third pusher 63 and the cavity defining portions 46, 47 of the plates 42, 43. Here, it should be noted that the first and third pushers 61, 63 may be simultaneously moved in the forward direction at once, or alternatively, the first and third pushers 61, 63 may be sequentially moved in the forward direction.

Figure 6:
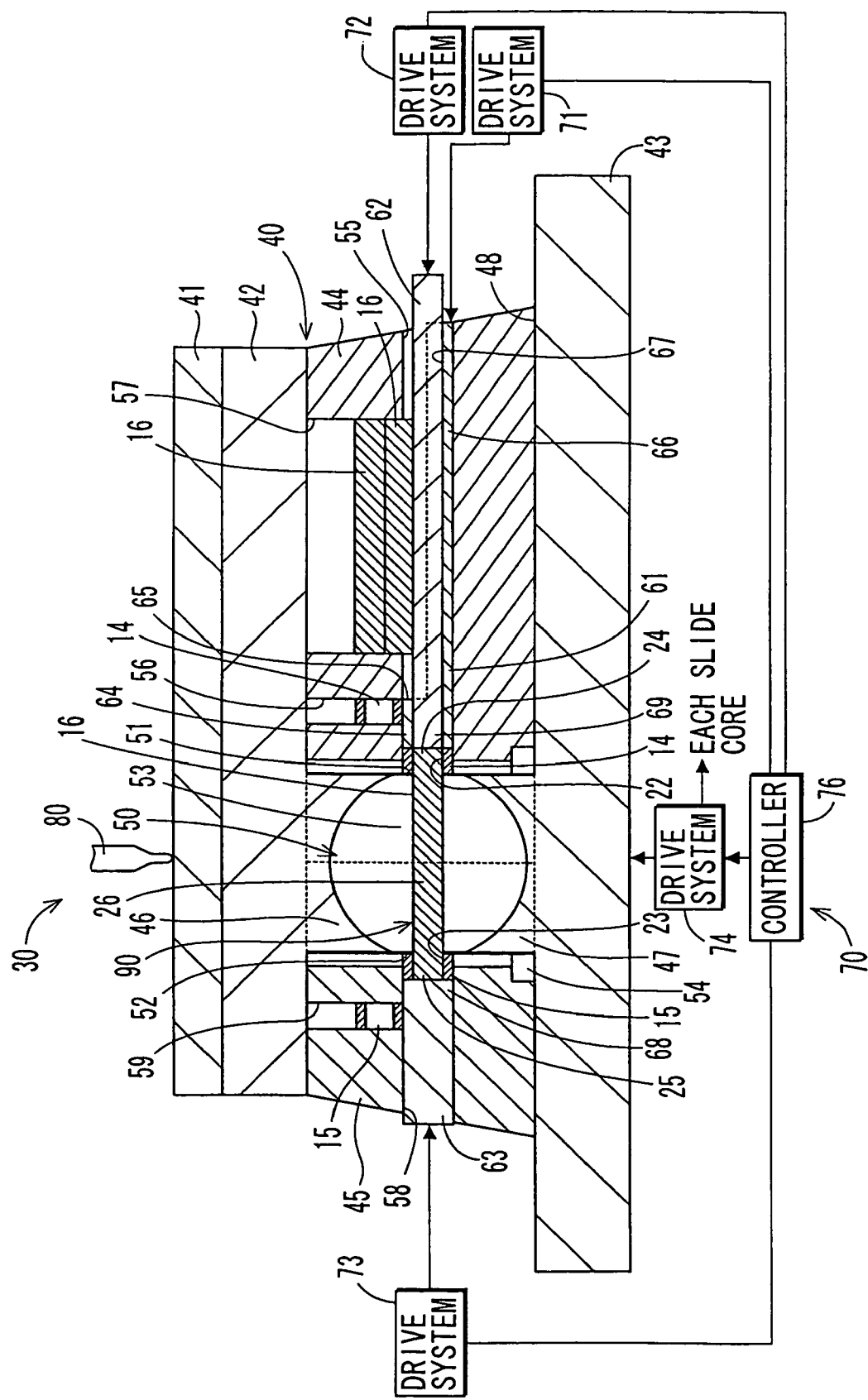
FIG. 6 is a cross sectional view of the insert molding apparatus of the first embodiment.

When the forward drive operation of the first and third pushers 61, 63 completes, the controller 76 controls the second drive system 72 to drive the second pusher 62 in its forward direction. Due to the forward drive operation of the second pusher 62, the distal end portion 69 of the second pusher 62 engages the shaft 16 located in the second feed position β and pushes the shaft 16 toward the first receiving portion 51 in the axial direction of the journal portions 24, 25. As a result, the shaft 16, which receives the urging force from the distal end portion 69 of the second pusher 62, is slid in the inner hole 67 of the first pusher 61 and is inserted into the hole 22 of the bearing 14 located in the first receiving portion 51 while the journal portion 25 of the shaft 16 serving as a leading end of the shaft 16. Furthermore, after the shaft 16 is slid in the hole 67 of the first pusher 61 and is then received into the receiving/molding portion 53 of the cavity 50 while the journal portion 25 serving as the leading end of the shaft 16, the journal portion 25 of the shaft 16 is inserted into the hole 23 of the bearing 15 located in the second receiving portion 52, as shown in FIG. 6. Due to the insertion of the journal portion 25 of the shaft 16 into the hole 23 of the bearing 15, the intermediate portion 26 of the shaft 16 is received in the receiving/molding portion 53, and the journal portion 24 of the shaft 16 is inserted into the hole 22 of the bearing 14. In this way, the journal portion 24, the journal portion 25 and the intermediate portion 26 of the shaft 16 are received in the first receiving portion 51, the second receiving portion 52 and the receiving/molding portion 53, respectively, of the cavity 50. In this state, the shaft 16 is positioned and is held between the distal end portion 69 of the second pusher 62 and the distal end portion 68 of the third pusher 63. Furthermore, in this received state of the shaft 16, the journal portions 24, 25 of the shaft 16 cooperate with the bearings 14, 15 to close the first and second through holes 55, 58.

Therefore, the journal portions 24, 25 of the shaft 16 are received in the holes 22, 23 of the bearings 14, 15 to form a composite insert 90 arranged in the cavity 50.

When the forward drive operation of the second pusher 62 completes, the controller 76 controls the fourth drive system 74 to apply a clamping force to the die arrangement 40 and also controls the injection device 80 to inject the molding material into the die arrangement 40. In this way, the molding material, which is injected from the injection device 80, is filled in the cavity 50 to cover the composite insert 90 located in the cavity 50. At this time, the first and second through holes 55, 58 are closed in the manner described above. Thus, the molding material, which is filled in the cavity 50, will not leak outward through the first and second through holes 55, 58.

Figure 7:
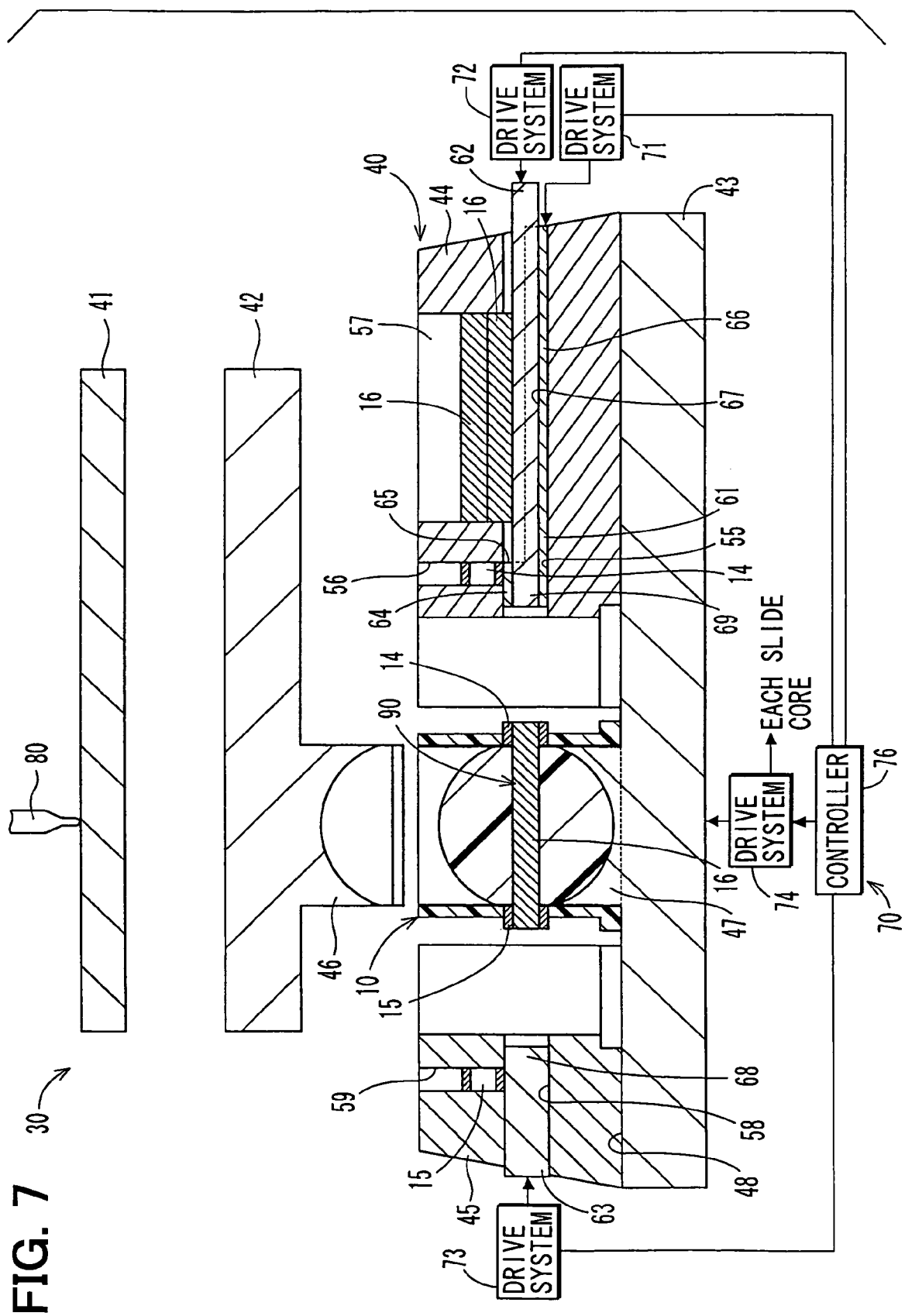
FIG. 7 is a cross sectional view of the insert molding apparatus of the first embodiment.

After the molding material, which is filled in the cavity 50, is cooled and is thus solidified, the controller 76 controls the fourth drive system 74 to open the die arrangement 40. Through this die opening drive operation, the plates 41-43 and the slide cores 44, 45 are separated, as shown in FIG. 7. At this time, the first and second pushers 61, 62 are held in its forward end position and are moved together with the first slide core 44, and the third pusher 63 is held in its forward end position and is moved together with the second slide core 45. Also, at this time, the throttle device 10, which is an insert molded product embedded with the composite insert 90, is held in the cavity defining portion 47 of the third plate 43 and is moved together with the third plate 43. Thereafter, the throttle device 10 is removed from the cavity defining portion 47 through, for example, action of an ejector pin.

Upon completion of the die opening drive operation of the die arrangement 40, if one of the feed holes 56, 57, 59 is empty, installation of the corresponding elements into the empty hole 56, 57, 59 is waited. In contrast, if none of the feed holes 56, 57, 59 is empty, the die closing drive operation is initiated once again.

According to the first embodiment, in the fully closed state of the die arrangement 40, the bearings 14, 15 are pushed by the first and third pushers 61, 63, so that the bearings 14, 15 are transferred to its predetermined position in the cavity 50. Also, according to the first embodiment, in the fully closed state of the die arrangement 40, the shaft 16 is pushed by the second pusher 62, so that the shaft 16 is transferred to its predetermined position in the cavity 50. Furthermore, according to the first embodiment, upon pushing of the bearings 14, 15 in the axial direction of the holes 22, 23 of the bearings 14, 15, which are arranged coaxial to the first and second through holes 55, 58, the shaft 16 is pushed in the axial direction of the journal portions 24, 25, which are coaxially arranged in the first through hole 55. Thus, the journal portions 24, 25 of the shaft 16 are axially overlapped with the holes 22, 23 of the bearings 14, 15 located in the cavity 50 and are received in the holes 22, 23 of the bearings 14, 15.

According to the first embodiment, the transferring operation of the bearings 14, 15 and of the shaft 15 can be performed together with the assembling operation of the composite insert 90, which includes the insert elements 14-16, without using a separate device, which is different from the insert molding apparatus 30. Furthermore, the transferring operation of the insert elements 14-16 and the assembling operation of the composite insert 90 can be performed in the fully closed state of the die arrangement 40. In addition, according to the first embodiment, the driving operation of the first to third pushers 61, 63 and the driving operation of the die arrangement 40 are integrally controlled by the controller 76. Thus, the transferring operation and assembling operation of the insert elements 14-16 as well as the insert molding operation can be automated. Thus, the production efficiency is improved, and the manufacturing costs are reduced.

Also, according to the first embodiment, the shaft 16 can be inserted into the first pusher 61 and the bearing 14, which are arranged coaxially in the first through hole 55, and this shaft 16 can be transferred to the cavity 50. Therefore, the first and second pushers 61, 62 can be operated without causing interference therebetween to push the bearing 14 and the shaft 16, which are supplied from the same side with respect to the cavity 50 but at different positions that are spaced from the cavity 50 by different distances.

Furthermore, according to the first embodiment, the first and third pushers 61, 63 are received in and are slid in the first and second through holes 55, 58, respectively, so that the movements of the first and third pushers 61, 63 are stabilized. The second pusher 62 is received in and is slid in the inner hole 67 of the first pusher 61, so that the movement of the second pusher 62 is stabilized. Therefore, it is possible to avoid occurrence of a change in an orientation of each insert element 14-16, which would be otherwise caused by the corresponding pusher 61-63 in the transferring operation thereof to disable insertion of the corresponding journal portion 24, 25 into the corresponding hole 22, 23.

Furthermore, according to the first embodiment, the bearings 14, 15 are received in and are slid in the first and second through holes 55, 58, and the shaft 16 is received in and is slid in the inner hole 67 of the first pusher 61. As a result, it is possible to avoid occurrence of a change in the orientation of each insert element 14-16, which would disable insertion of the corresponding journal portion 24, 25 into the corresponding hole 22, 23.

In addition, according to the first embodiment, there are used the feed holes 56, 57, 59, which are connected to the corresponding linear through hole 55, 58 at its lower end, and in each of which the plurality of insert elements of the corresponding type 14-16 is received and is aligned generally in the vertical direction. In this way, even in the fully closed state of the die arrangement 40, the corresponding insert element 14-16 is automatically fed to the corresponding feed position α, β, γ of the corresponding through hole 55, 58 by the gravity. Therefore, the production efficiency can be improved.

Second Embodiment

Figure 8:
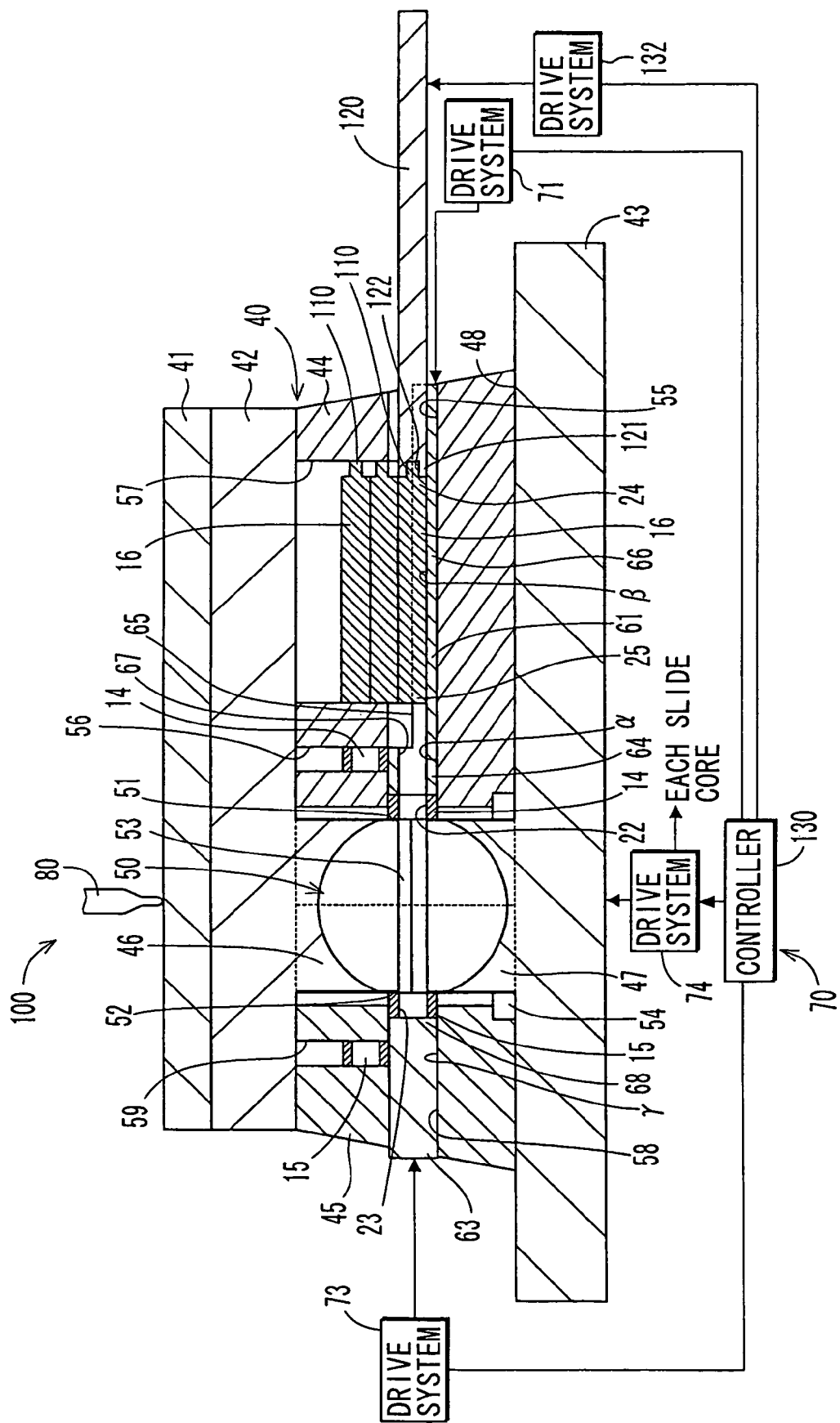
FIG. 8 is a cross sectional view of an insert molding apparatus according to a second embodiment.
Figure 9A:
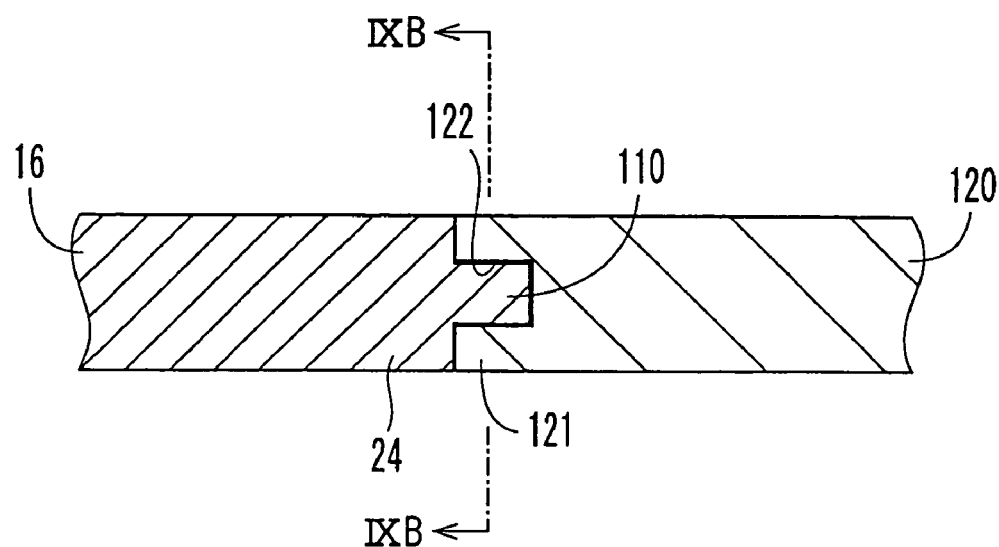
FIG. 9A is an enlarged view of a portion of FIG. 8.
Figure 9B:
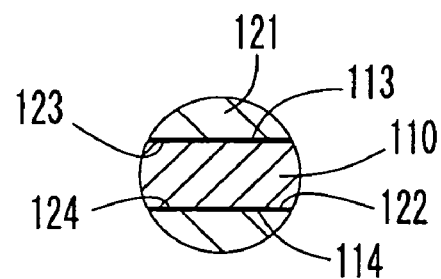
FIG. 9B is a cross sectional view take along line IXB-IXB in FIG. 9A.
Figure 10:
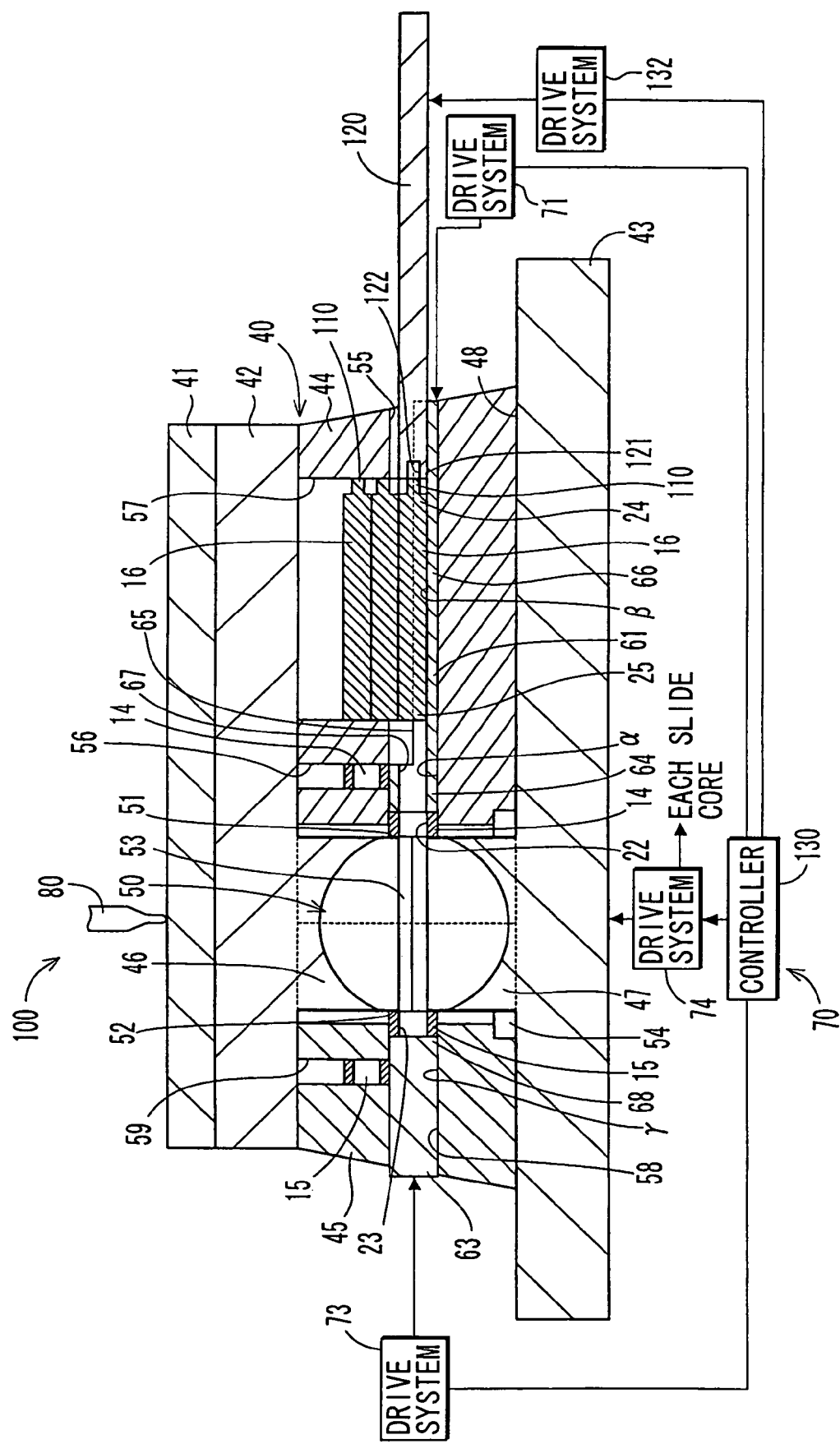
FIG. 10 is a cross sectional view of the insert molding apparatus of the second embodiment.

A second embodiment of the present invention is a modification of the first embodiment, and FIGS. 8-10 show the insert molding apparatus 100 of the second embodiment. Hereinafter, components similar to those of the first embodiment are indicated by the same numeral and will not be described further for the sake of simplicity.

In the insert molding apparatus 100, a recess 122 is provided in the distal end portion 121 of the second pusher 120. The recess 122 is engageable with a protrusion 110, which is provided in the journal portion 24 of the shaft 16. The protrusion 110 has a double sided structure, which includes two planar outer surfaces 113, 114, which are parallel to each other and are diametrically opposed to each other in the journal portion 24. The recess 122 is formed into a complementary shape, which is complementary to the protrusion 110 and includes two planar inner surfaces 123, 124, which are parallel to each other and are diametrically opposed to each other in the pusher 120.

The second drive system 132, which is controlled by the controller 130, has the function of driving the second pusher 120 in the forward direction and the backward direction and also a function of rotating the second pusher 120 in a normal direction and a reverse direction about the axis of the second pusher 120. The above normal and reverse rotational drive operation is implemented by applying a drive force (torque) to the second pusher 120 in a circumferential direction of the second pusher 120.

Next, the operation of the insert molding apparatus 100 will be described.

In the insert molding apparatus 100, after the completion of the forward drive operation of the first and third pushers 61, 63, the controller 130 controls the second drive system 132, so that the second pusher 120, which is located in the backward end position, is driven to move a predetermined distance in the forward direction, as shown in FIG. 10. Due to the forward drive operation of the second pusher 120, the recess 122 of the second pusher 120 is engaged with the protrusion 110 of the shaft 16 located in the second feed position β, as shown in FIG. 8. Next, the controller 130 controls the second drive system 132 to rotate the second pusher 120 in the normal direction and/or the reverse direction. Due to the normal and/or reverse rotational drive operation of the second pusher 120, the rotational drive force is conducted from the planar inner surfaces 123, 124 of the recess 122 of the second pusher 120 to the planar outer surfaces 113, 114 of the protrusion 110, so that the shaft (control subject insert element) 16 is rotated about its axis. Therefore, for example, the orientation of the shaft 16 can be adjusted in such a manner that a circumferential reference position of the shaft 16 is placed in a desired position. When the orientation adjustment of the shaft 16 is completed, the controller 130 controls the second drive system 132 to drive the second pusher 120 in the forward direction once again. As a result, similar to the first embodiment, the shaft 16 is transferred to the cavity 50, and the assembling of the composite insert 90 and the installation and positioning of the composite insert 90 in the cavity 50 are completed.

In the second embodiment, the second pusher 120 and the second drive system 132 correspond to a second urging means, and the second pusher 120 corresponds to a second type urging member. Furthermore, the second pusher 120 and the second drive system 132 correspond to an orientation control means for controlling the orientation of the shaft 16 using the distal end portion 121 of the second pusher 120.

As discussed above, in the second embodiment, the orientation of the shaft 16 in the circumferential direction can be adjusted before the transferring of the shaft 16 to the cavity 50. Thus, the orientation adjusted shaft 16, the orientation of which is adjusted, can be transferred to the cavity 50, so that the product quality can be improved.

Furthermore, in the second embodiment, the function of adjusting the orientation of the shaft 16 and the function of transferring the shaft 16 to the cavity 50 are implemented using the common elements 120, 132. Thus, the manufacturing costs can be reduced.

Third Embodiment

Figure 11:
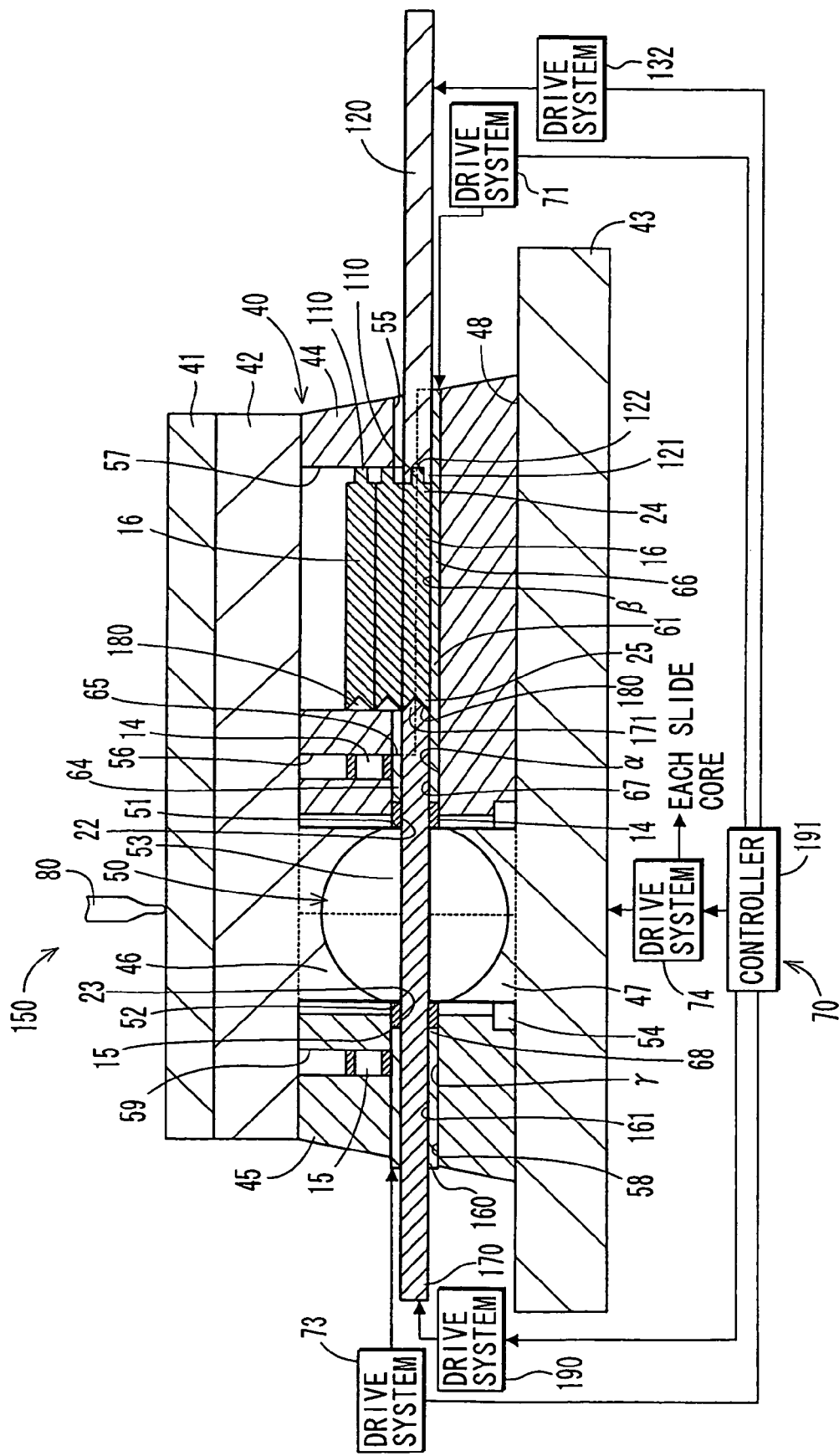
FIG. 11 is a cross sectional view of an insert molding apparatus according to a third embodiment.
Figure 12:
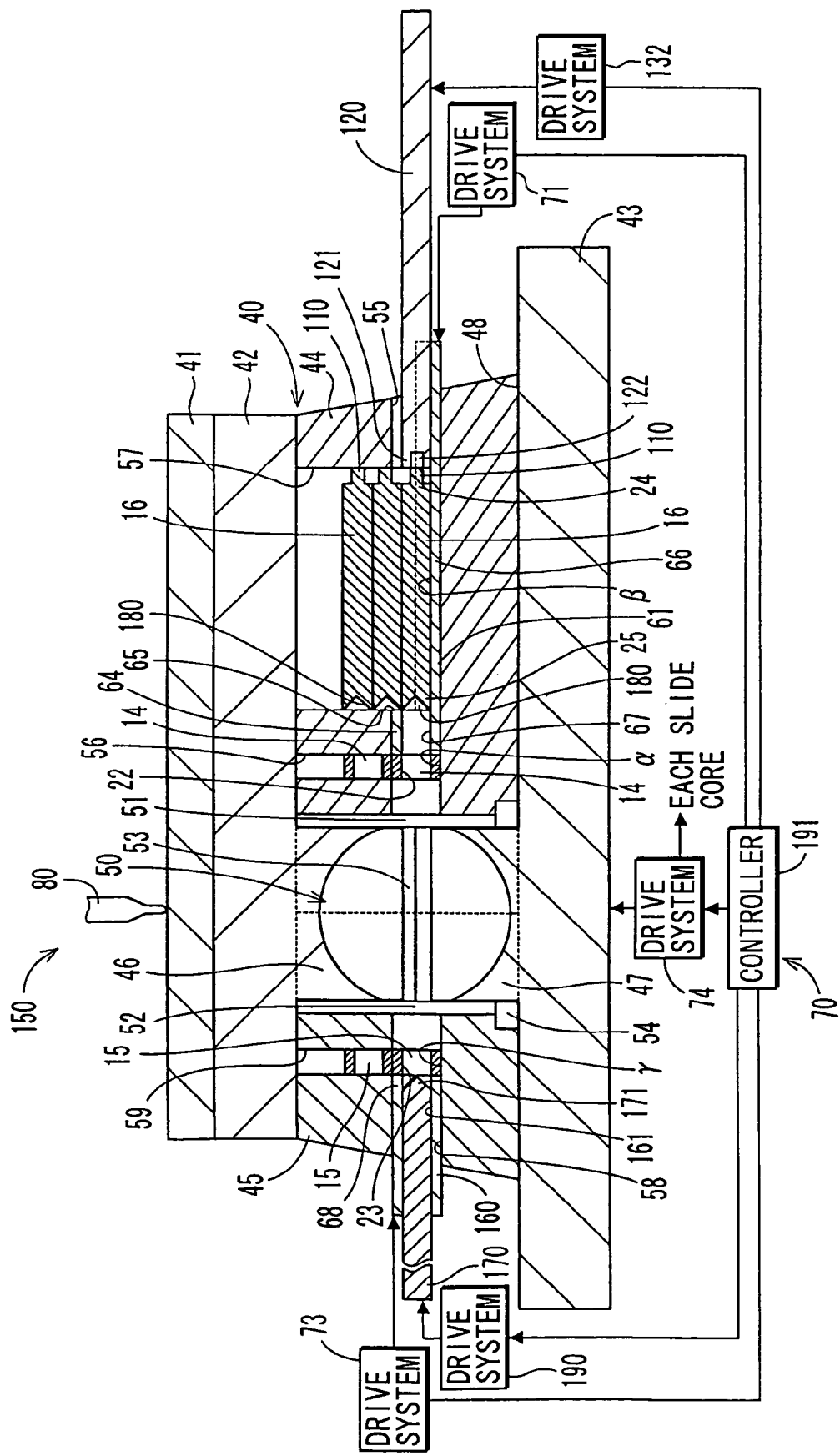
FIG. 12 is a cross sectional view of the insert molding apparatus of the third embodiment.
Figure 13:
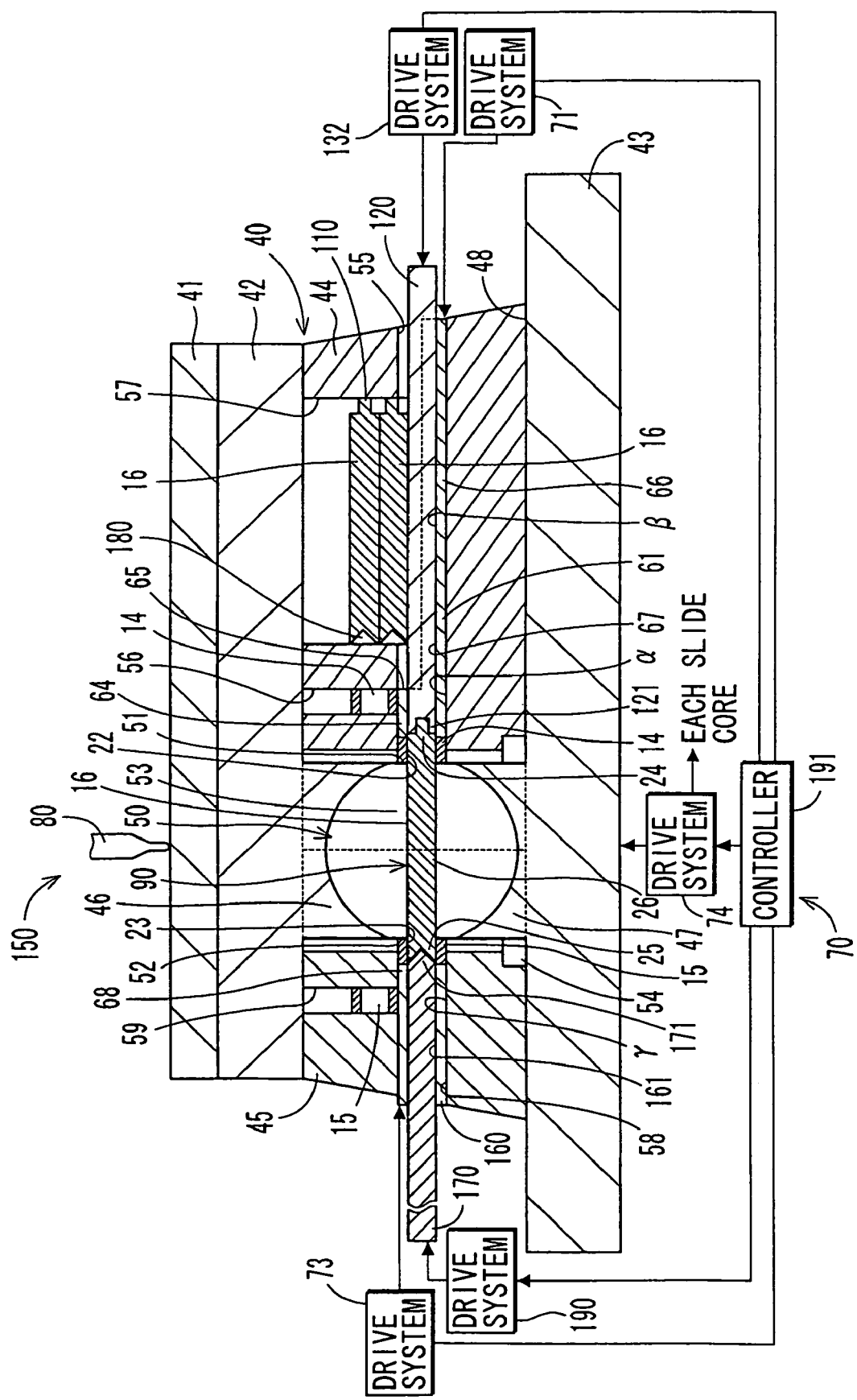
FIG. 13 is a cross sectional view of the insert molding apparatus of the third embodiment.

A third embodiment of the present invention is a modification of the second embodiment, and FIGS. 11-13 show the insert molding apparatus 150 of the third embodiment. Hereinafter, components similar to those of the second embodiment are indicated by the same numeral and will not be described further for the sake of simplicity.

In the insert molding apparatus 150, the third pusher 160 is not formed as the cylindrical solid bar. Rather, the third pusher 160 of the third embodiment is formed as a cylindrical tube, which has an inner diameter that allows coaxial insertion of a guide pusher 170 into the third pusher 160.

The guide pusher 170 is formed as a metal cylindrical solid bar, which extends linearly in the axial direction. In the section of the guide pusher 170 other than a distal end portion 171 of the guide pusher 170, an outer diameter of the guide pusher 170 is generally the same as the inner diameter of the first and third pushers 61, 160 and the inner diameter of the bearings 14, 15. The distal end portion 171 of the guide pusher 170 is tapered such that the outer diameter of the distal end portion 171 progressively decreases toward its distal end. A taper angle of the distal end portion 171 is generally equal to or smaller than a tapered angle of a tapered recess 180, which is provided in the journal portion 25 of the shaft 16. The guide pusher 170 is coaxially received in the inner hole 161 of the third pusher 160 and is reciprocably slidable in the axial direction. The guide pusher 170 is driven by the fifth drive system 190, which is provided in the drive device 70, so that the guide pusher 170 is driven toward the first through hole 55 in the forward direction or is driven toward the opposite direction, which is opposite from the first through hole 55, in the backward direction. In the backward end position of the guide pusher 170 shown in FIG. 12, the guide pusher 170 is located on a backward side of the third feed position γ and opens the space immediately below the third feed hole 59. Thus, feeding of the bearing 15 to the third feed position γ is permitted.

The fifth drive system 190 is electrically connected to the controller 191. The controller 191 controls the operation of the fifth drive system 190 in addition to the operations of the first to fourth drive systems 71, 132, 73, 74. Through the control operation of the fifth drive system 190, the movement of the guide pusher 170 in the forward direction and the backward direction is controlled.

Next, the operation of the insert molding apparatus 150 will be described.

In the insert molding apparatus 150, upon completion of the die closing drive operation of the die arrangement 40, the controller 191 drives the first to third and fifth drive systems 71, 132, 73, 190 to move the first to third pushers 61, 120, 160 and the guide pusher 170 in its backward direction. When each pusher 61, 120, 160, 170 reaches its backward end position due to the backward drive operation of the pusher 61, 120, 160, 170, the space immediately below the corresponding one of the first to third feed holes 56, 57, 59 is opened, so that the corresponding one of the bearing 14, the shaft 16 and the bearing 15 is automatically fed to the corresponding feed position α-γ.

Furthermore, in the insert molding apparatus 150, after the completion of the forward drive operation of the first and third pushers 61, 160, the controller 191 controls the second and fifth drive systems 132, 190, so that each of the second pusher 120 and the guide pusher 170 is driven to move a predetermined distance in its forward direction. Due to the forward drive operation of the second pusher 120, the recess 122 of the second pusher 120 is engaged with the protrusion 110 of the shaft 16 located in the second feed position β, as in the case of the second embodiment. Due to the forward drive operation of the guide pusher 170, the guide pusher 170 is inserted through the hole 23 of the bearing 15 located in the third feed position γ. Thereafter, the guide pusher 170 is inserted into the receiving/molding portion 53 while the guide pusher 170 is slid in the third pusher 160, and the distal end portion 171 serves as the leading end of the guide pusher 170. Also, the guide pusher 170 is inserted through the hole 22 of the bearing 14 located in the first receiving portion 51 while the distal end portion 171 serves as the leading end of the guide pusher 170. Then, the guide pusher 170 is inserted into and is slid in the inner hole 67 of the first pusher 61. As a result, as shown in FIG. 11, the guide pusher 170 is inserted into and is engaged with the recess 180 of the shaft 16 located in the second feed position β. Therefore, the center of the shaft 16 is appropriately adjusted to coincide with the center of the guide pusher 170. Here, it should be noted that the second pusher 120 and the guide pusher 170 may be simultaneously moved in the forward direction at once, or alternatively, the second pusher 120 and the guide pusher 170 may be sequentially moved in the forward direction.

Upon completion of the adjustment of the center of the shaft 16, similar to the second embodiment, the controller 191 rotates the second pusher 120 in the normal direction and the reverse direction to adjust the orientation of the shaft 16. Then, the controller simultaneously controls the second and fifth drive systems 132, 190 to drive the second pusher 120 in the forward direction once again and to drive the guide pusher 170 in the backward direction. At this time, the forward moving speed of the second pusher 120 and the backward moving speed of the guide pusher 170 are generally the same. As a result, the shaft 16, which receives the urging force from the distal end portion 121 of the second pusher 120, is transferred to the cavity 50 while being clamped between the second pusher 120 and the guide pusher 170. Therefore, as shown in FIG. 13, the shaft 16 is inserted into the bearings 14, 15 located in the cavity 50. Here, the guide pusher 170 is driven in the backward direction until the guide pusher 170 reaches the position of FIG. 13 where the shaft 16 is clamped between the guide pusher 170 and the second pusher 120, which is now in its forward end position.

Therefore, the assembling of the composite insert 90 and the installation and positioning of the composite insert 90 in the cavity 50 are completed.

In the present embodiment, the third pusher 160 and the third drive system 73 correspond to a first urging means, and the first pusher 61 and the first drive system 71 correspond to another type of first urging means. The third pusher 160 corresponds to a first type urging member, and the first pusher 61 corresponds to another first type urging member. Furthermore, the guide pusher 170 and the fifth drive system 190 correspond to an orientation control means. Also, the second pusher 120 and the second drive system 132 correspond to another type of orientation control means. The guide pusher 170 corresponds to a transferring member. Also, the second pusher 120 corresponds to another type of transferring member.

According to the third embodiment, the orientation of the shaft 16 can be adjusted before initiation of the transferring of the shaft 16. Also, the orientation of the shaft 16 can be maintained by clamping the shaft 16 between the second pusher 120 and the guide pusher 170 at the time of transferring the shaft 16. Therefore, it is possible to avoid occurrence of a change in the orientation of the shaft 16, which would disable insertion of the corresponding journal portion 24, 25 into the corresponding hole 22, 23, during the transferring of the shaft 16.

Furthermore, according to the third embodiment, the guide pusher 170 is received in and is slid in the inner holes 67, 161 of the first and third pushers 61, 160. Thus, movement of the guide pusher 170 is stabilized. As a result, it is possible to avoid occurrence of the change in the attitude of the shaft 16 and the subsequent disallowance of the insertion of each journal portion 24, 25 into the corresponding hole 22, 23, during the transferring of the shaft 16.

Fourth Embodiment

Figure 14:
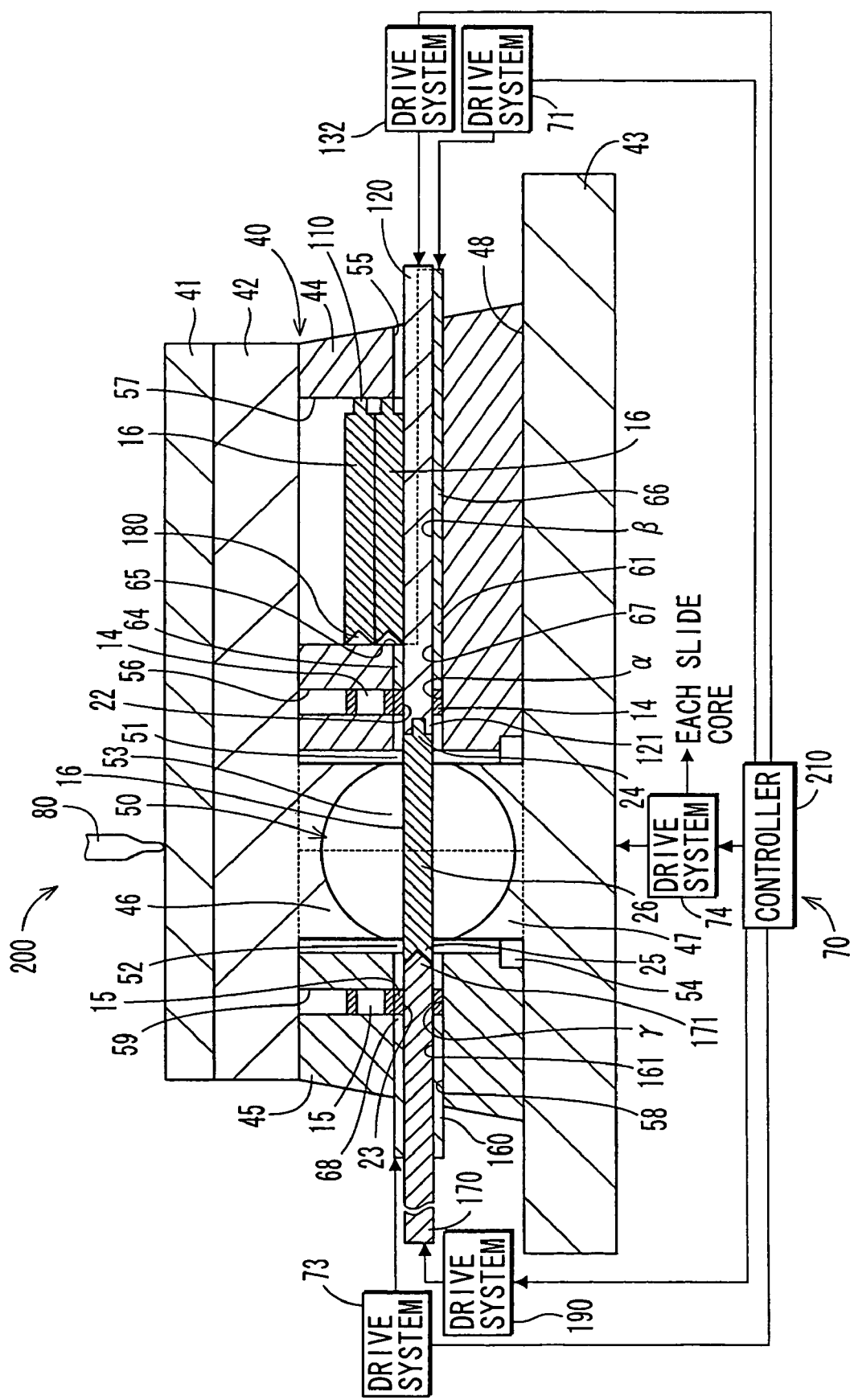
FIG. 14 is a cross sectional view of an insert molding apparatus according to a fourth embodiment.
Figure 15:
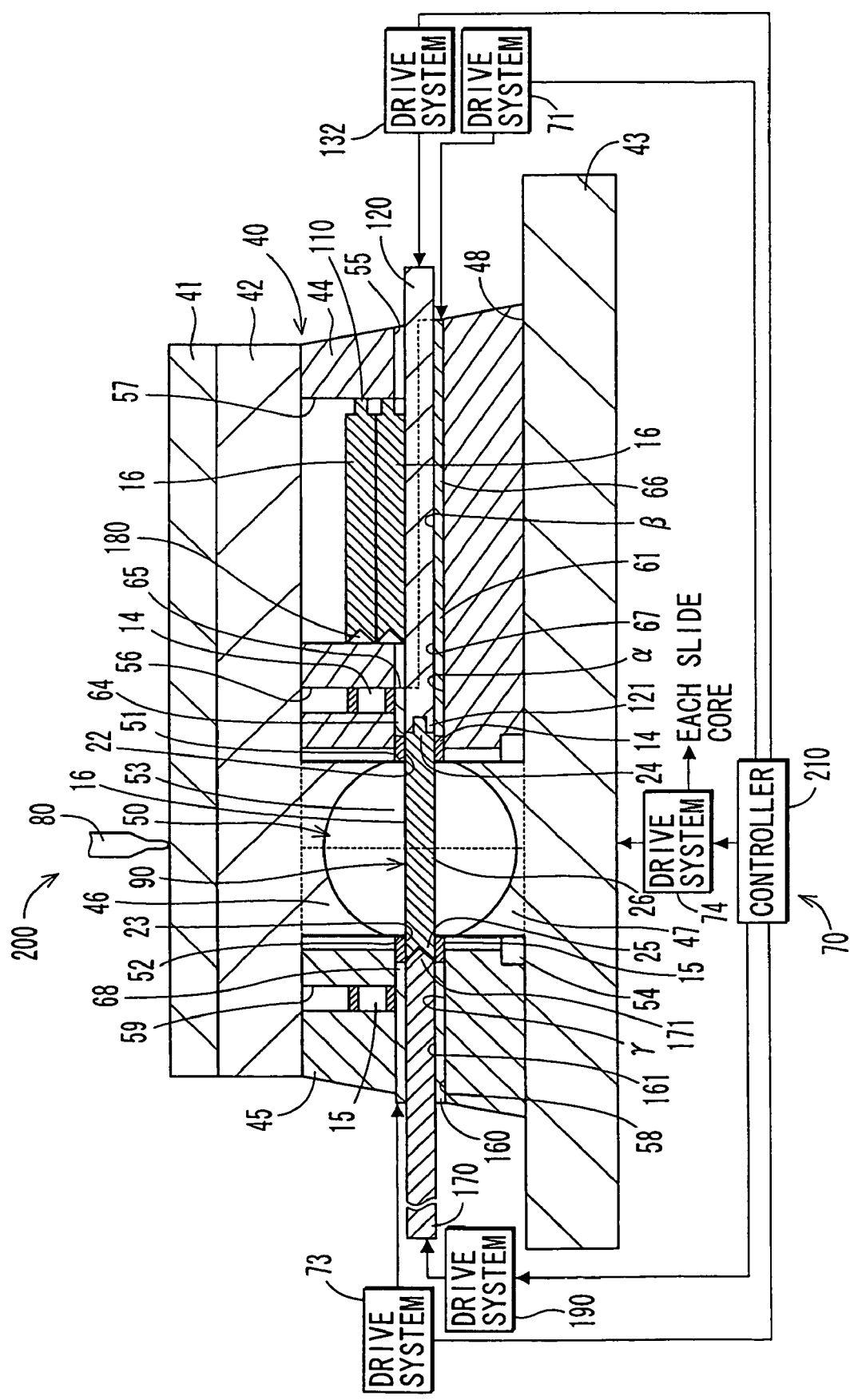
FIG. 15 is a cross sectional view of the insert molding apparatus of the fourth embodiment.

A fourth embodiment of the present invention is a modification of the third embodiment, and FIGS. 14 and 15 show the insert molding apparatus 200 of the fourth embodiment. Hereinafter, components similar to those of the third embodiment are indicated by the same numeral and will not be described further for the sake of simplicity.

The insert molding apparatus 200 of the fourth embodiment is similar to the insert molding apparatus 150 of the third embodiment except that the controller 210 of the fourth embodiment is different from the controller 191 of the third embodiment.

In the insert molding apparatus 200, the controller 210 operates the second pusher 120 and the guide pusher 170 in a manner similar to that of the third embodiment before the forward drive operation of the first and third pushers 61, 160. More specifically, the forward drive operation of the second pusher 120 and the guide pusher 170, the normal and reverser rotational drive operation of the second pusher 120, and the forward redrive operation of the second pusher 120 and the backward drive operation of the guide pusher 170 (hereinafter, simply referred to as the forward redrive and backward drive operation of the second pusher 120 and the guide pusher 170) are performed by the controller 210 in the manner similar to that of the third embodiment. However, in the middle of the transferring of the shaft 16, which is transferred by the forward redrive and backward drive operation of the second pusher 120 and the guide pusher 170, the shaft 16 is sequentially inserted to the inner hole 67 of the distal end portion 64 of the first pusher 61 and the hole 22 of the bearing 14 located in the first feed position α while the journal portion 25 serves as the leading end of the shaft 16. In this way, each described portion 24, 25, 26 of the shaft 16, which is slid in the first pusher 61 and the bearing 14, is received in the corresponding portion 51-53 of the cavity 50 at the end of the transferring, as shown in FIG. 14. In this received state of the shaft 16, the shaft 16 is clamped by the second pusher 120 and the guide pusher 170, so that the shaft 16 is positioned there.

In the insert molding apparatus 200, upon completion of the forward redrive and backward drive operation of the second pusher 120 and the guide pusher 170, the controller 210 controls the first and third drive systems 71, 73 to drive the first and third pushers 61, 160 in the forward direction. By the forward drive operation, the first pusher 61 urges and moves the bearing 14 toward the first receiving portion 51. Thus, the bearing 14 is received in and is slid in the first through hole 55, so that the bearing 14 is fitted over the journal portion 24 of the shaft 16 located in the first receiving portion 51, as shown in FIG. 15. As a result, the bearing 14 is received in the first receiving portion 51 in such a manner that the bearing 14 is positioned between the first pusher 61 and the cavity defining portions 46, 47 while the journal portion 24 is received in the hole 22 of the bearing 14. Furthermore, by the forward drive operation of the third pusher 160, the third pusher 160 urges and moves the bearing 15 toward the second receiving portion 52. Thus, the bearing 15 is received in and is slid in the second through hole 58, so that the bearing 15 is fitted over the journal portion 25 of the shaft 16 located in the second receiving portion 52, as shown in FIG. 15. As a result, the bearing 15 is received in the second receiving portion 52 in such a manner that the bearing 15 is positioned between the third pusher 160 and the cavity defining portions 46, 47 while the journal portion 25 is received in the hole 23 of the bearing 15. Here, it should be noted that the first and third pushers 61, 160 may be simultaneously moved in the forward direction at once, or alternatively, the first and third pushers 61, 160 may be sequentially moved in the forward direction.

Therefore, the assembling of the composite insert 90 and the installation and positioning of the composite insert 90 in the cavity 50 are completed.

Furthermore, according to the fourth embodiment, upon pushing of the shaft 16 in the axial direction of the journal portions 24, 25, which are coaxially arranged in the first through hole 55, each bearing 14, 15 is pushed in the axial direction of its hole 22, 23, which is coaxially arranged in the corresponding one of the first and second through holes 55, 58. Therefore, the hole 22, 23 of each bearing 14, 15 can be overlapped with the corresponding journal portion 24, 25 of the shaft 16 in the cavity 50 in the axial direction, and at the same time, the hole 22, 23 of each bearing 14, 15 can be fitted over the journal portion 24, 25. As a result, even in the fourth embodiment, the assembling operation of the composite insert 90 can be performed without using a separate device, which is different from the insert molding apparatus 200 in the fully closed state of the die arrangement 40.

Fifth Embodiment

A fifth embodiment of the present invention is a modification of the first embodiment, and FIGS. 16-21 show the insert molding apparatus 300 of the fifth embodiment. Hereinafter, components similar to those of the first embodiment are indicated by the same numeral and will not be described further for the sake of simplicity.

Figure 17:
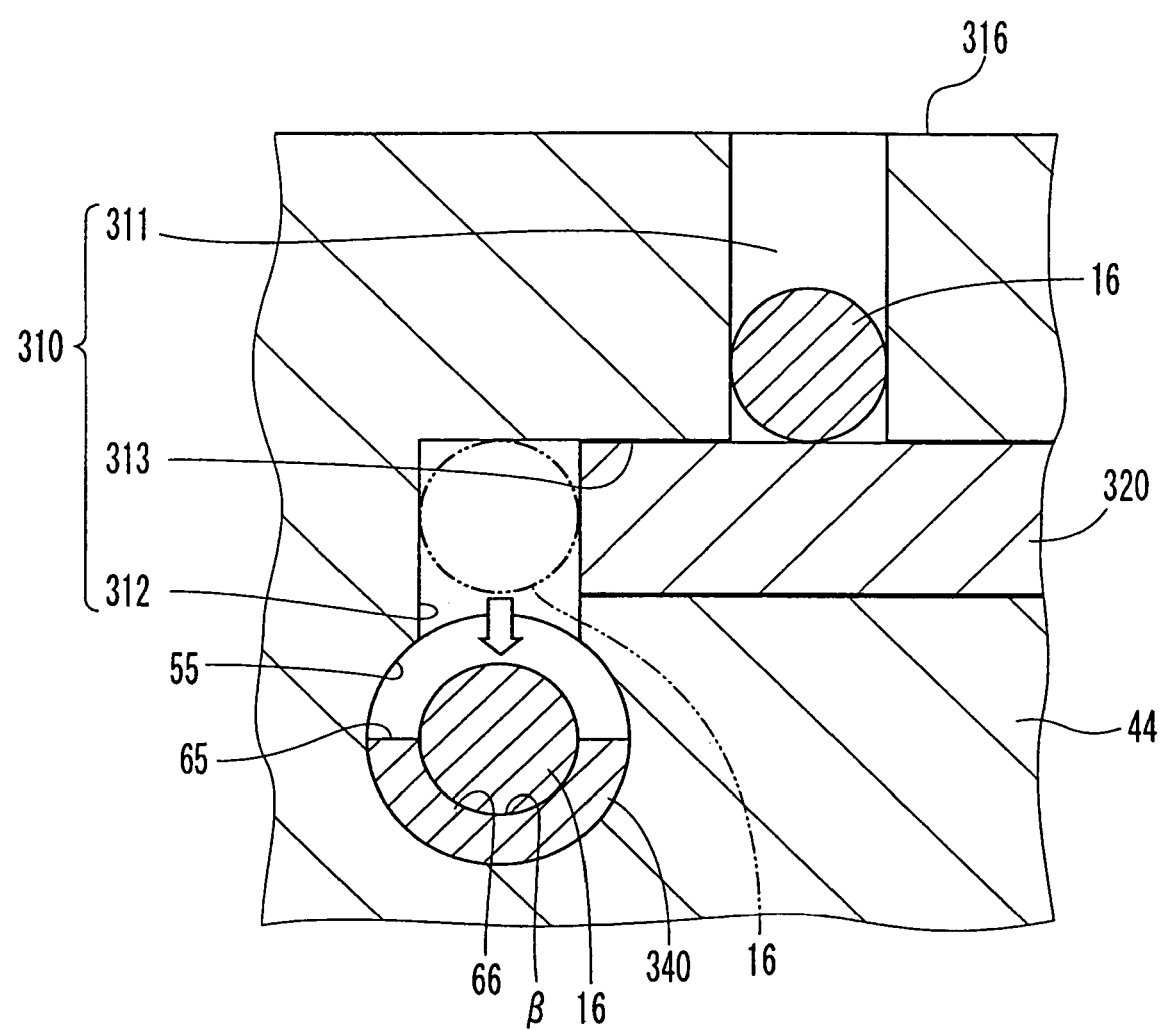
FIG. 17 is cross sectional view taken along line XVII-XVII in FIG. 16.
Figure 18:
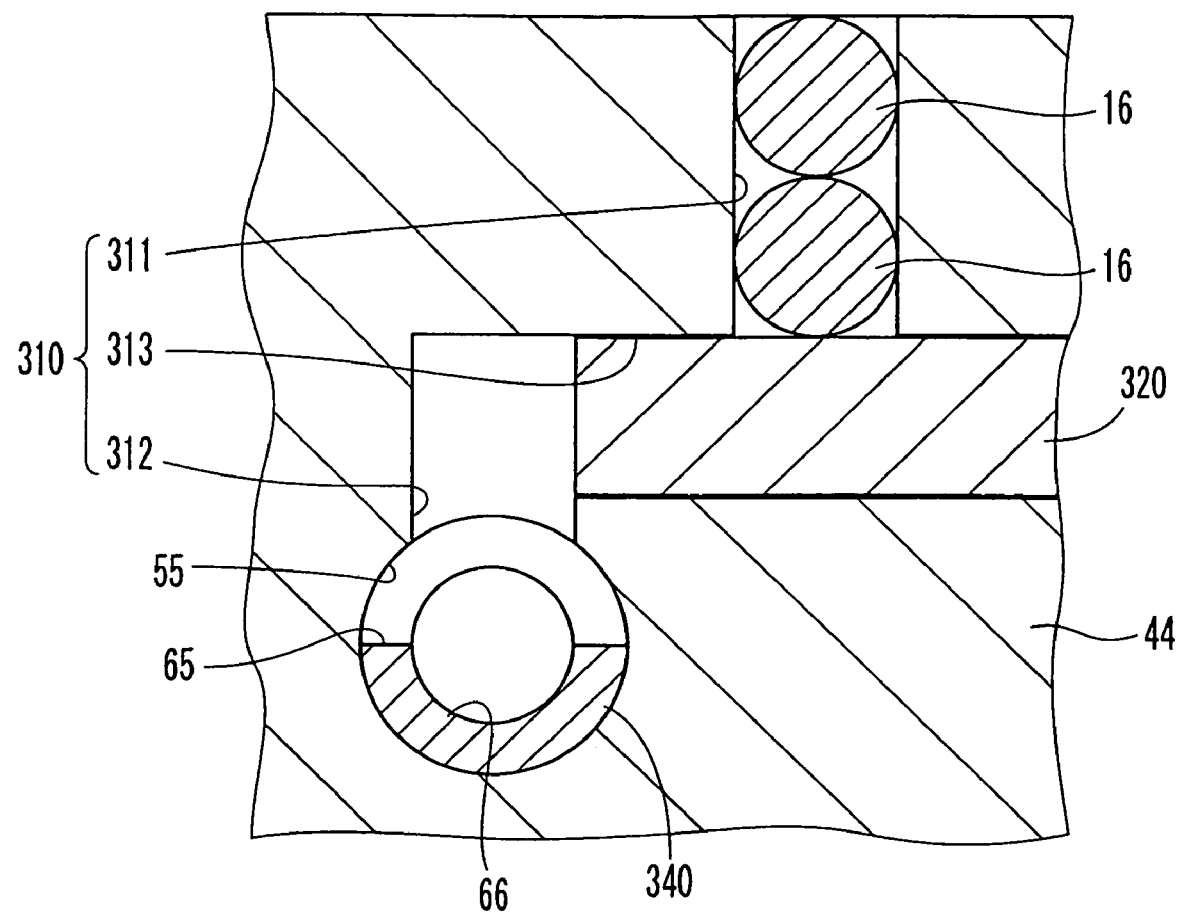
FIG. 18 is a cross sectional view of the insert molding apparatus of the fifth embodiment similar to FIG. 17.

In the insert molding apparatus 300, the second feed hole 310 includes a holding portion 311, a feed portion 312 and a guide portion 313. The holding portion 311 extends downward from the die engaging surface 316 of the first slide core 44, which engages the second plate 42, in the vertical direction along an imaginary line, which is not located in the same plane with respect to the axis of the first through hole 55. In other words, the axis of the holding portion 311 is located in the imaginary vertical plane, which is apart from the imaginary vertical plane that contains the axis of the first through hole 55, as shown in FIG. 17. The feed portion 312 extends upward from the top side of the second feed position β of the first through hole 55 along an imaginary line, which is perpendicular to the axis of the first through hole 55. The guide portion 313 extends linearly generally in the horizontal direction. One end of the guide portion 313 is connected to the top end of the feed portion 312, and an intermediate part of the guide portion 313 is connected to the lower end of the holding portion 311. Thus, according to the present embodiment, the lower end of the feed portion 312, which is connected to the first through hole 55, forms the lower end of the second feed hole 310. Each of the holding portion 311, the feed portion 312 and the guide portion 313 has a rectangular cross section in a plane perpendicular to an axial direction thereof and also has an inner size, which permits insertion of the shaft 16 that is oriented in such a manner that the radial direction and the axial direction of the shaft 16 coincide with the vertical direction and the horizontal direction, respectively.

In the fully opened state of the die arrangement 40, the shafts 16 can be inserted from the second plate 42 side into the holding portion 311. The shafts 16 are aligned one after another generally in the vertical direction in the holding portion 311 and are held by the inner wall of the holding portion 311. The lowest shaft 16, which has reached the lower end of the holding portion 311, is supplied to the guide portion 313 by the gravity as soon as an obstacle immediately below the lowest shaft 16 is removed to provide an empty space for accommodating the shaft 16.

A rectangular column shaped feed pusher 320 is received in the guide portion 313 in an axially reciprocably slidable manner. The feed pusher 320 is driven by a feed drive system 330 arranged in the drive device 70, so that the feed pusher 320 is moved forward toward feed portion 312 or is moved backward in an opposite direction, which is opposite from the feed portion 312. In predetermined positions, such as the forward end position of FIG. 18, which are other than the backward end position of FIG. 19, the feed pusher 320 partially or entirely coves the lower end of the holding portion 311, so that feeding of the shaft 16 from the holding portion 311 into the guide portion 313 is prevented. In contrast, in the backward end position, the feed pusher 320 is located on the backward side of the holding portion 311 to open the space immediately below the holding portion 311 and thereby to permit feeding of the shaft 16 by the gravity from the holding portion 311 to the guide portion 313. The shaft 16, which is fed to the guide portion 313 upon the positioning of the feed pusher 320 in its backward end position, is urged and is moved in the guide portion 313 by the feed pusher 320 to the point above the feed portion 312. The shaft 16, which has reached the point above the feed portion 312, is fed into the feed portion 312 by the gravity. The shaft 16, which is fed to the feed portion 312, is automatically fed to the second feed position β when the space immediately below the feed portion 312 is opened, as shown in FIGS. 16 and 17.

In the insert molding apparatus 300, a base end portion 342 of the first pusher 340, which is opposite from the distal end portion 341 of the first pusher 340, is not notched, thereby having the upper half. That is, a window 65 is formed in the first pusher 340 between the distal end portion 341 and the base end portion 342. Furthermore, in the insert molding apparatus 300, a common pusher 360, which serves as a common urging member, is formed integrally in a base end portion of the second pusher 350, which is opposite from the distal end portion 341. The common pusher 360 extends linearly in the axial direction and is formed as a cylindrical solid bar, which is coaxial with the second pusher 350. An outer diameter of the common pusher 360 is generally the same as the outer diameter of the first pusher 340. Specifically, the common pusher 360 has a cross sectional area, which is larger than that of the second pusher 350. The common pusher 360 is coaxially received in the first through hole 55 and is reciprocably slidable in the axial direction. The common pusher 360 is driven by the second drive system 332, so that the common pusher 360 is driven along with the second pusher 350 toward the first receiving portion 51 in the forward direction or is driven along with the second pusher 350 away from the first receiving portion 51 in the backward direction. As discussed above, in the insert molding apparatus 300, in place of the second pusher 350, the common pusher 360 is driven by the second drive system 332. The drive operation of the second pusher 350 is achieved simultaneously together with the drive operation of the common pusher 360.

A resilient member 370 is interposed between the base end portion 342 of the first pusher 340, which is opposite from the distal end portion 341 of the first pusher 340, and the second pusher side end portion (the base end portion) 361 of the common pusher 360. The resilient member 370 is made of a compression coil spring and is arranged coaxially with the first pusher 340 and the common pusher 360. When the common pusher 360 is driven in the forward direction, the first pusher 340 is driven in the forward direction by the urging force of the resilient member 370. Furthermore, the opposed ends of the resilient member 370 are engaged with the first pusher 340 and the common pusher 360, respectively. When the common pusher 360 is driven in the backward direction, the first pusher 340 is pulled toward the common pusher 360 side through the resilient member 370, so that the first pusher 340 is driven in the backward direction. As discussed above, in the insert molding apparatus 300, the drive operation of the first pusher 340 is achieved simultaneously together with the drive operation of the common pusher 360. Thus, in the insert molding apparatus 300, the first drive system 71 of the first embodiment is not provided.

Figure 16:
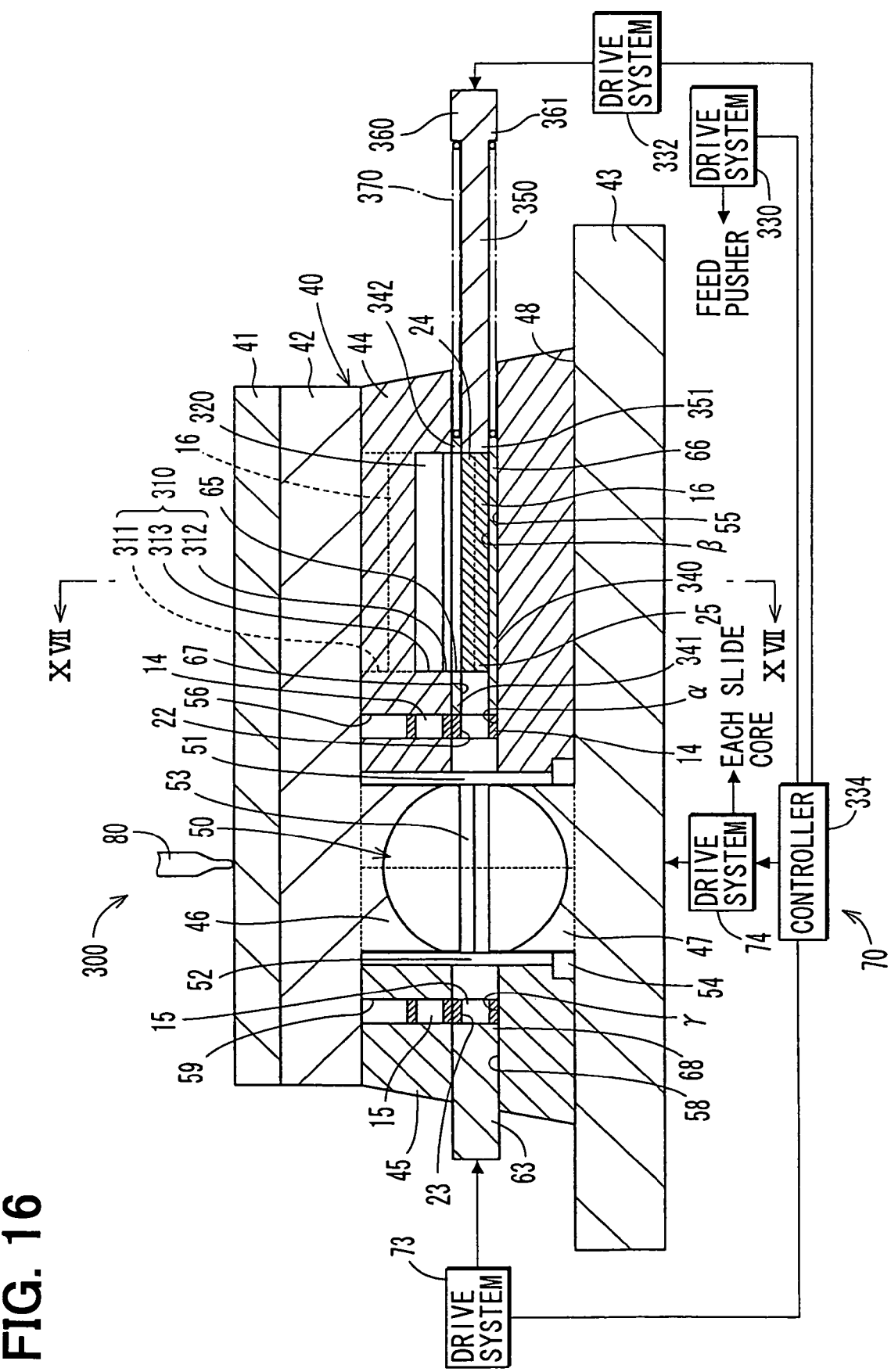
FIG. 16 is a cross sectional view of an insert molding apparatus according to a fifth embodiment.
Figure 20:
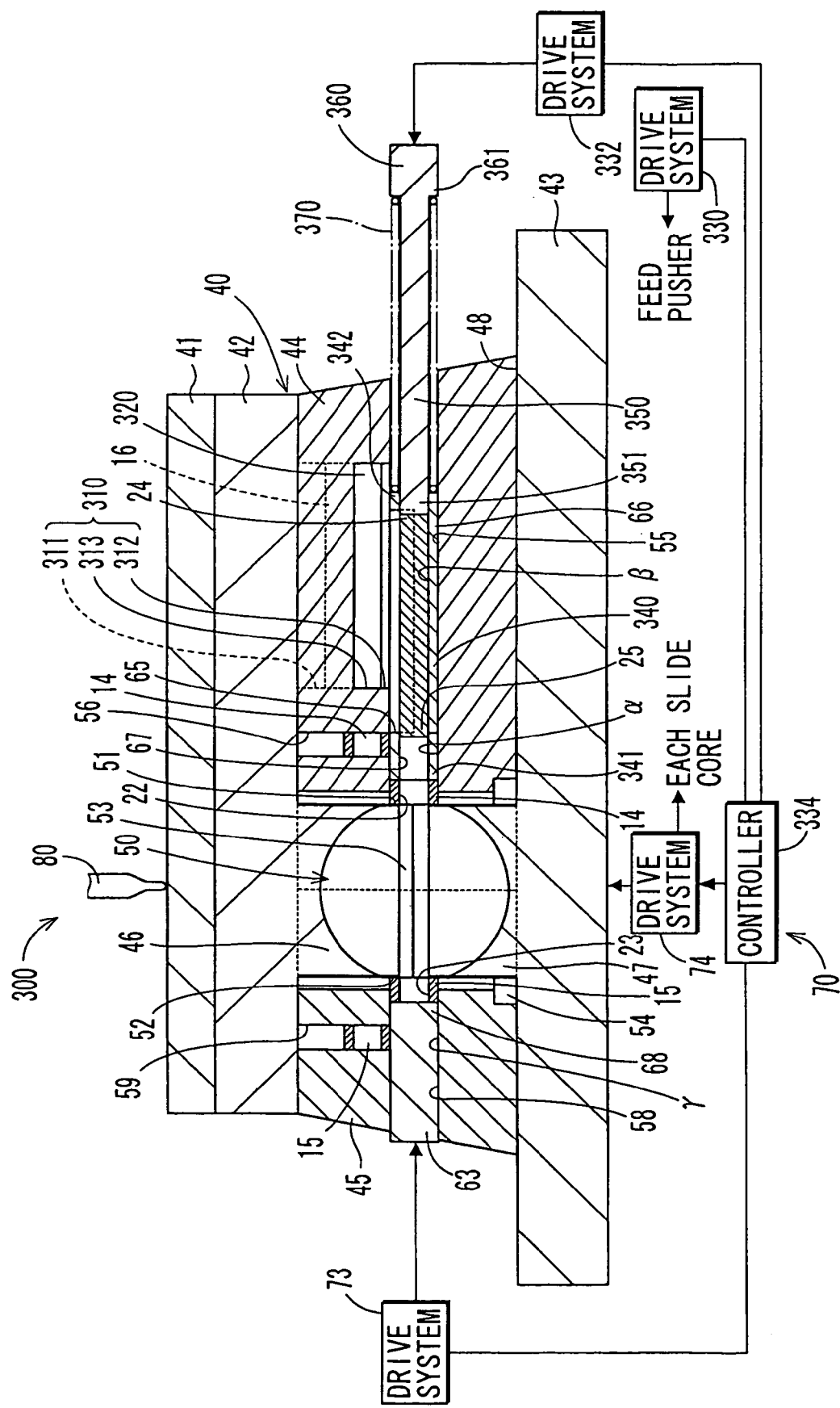
FIG. 20 is a cross sectional view of the insert molding apparatus of the fifth embodiment.
Figure 21:
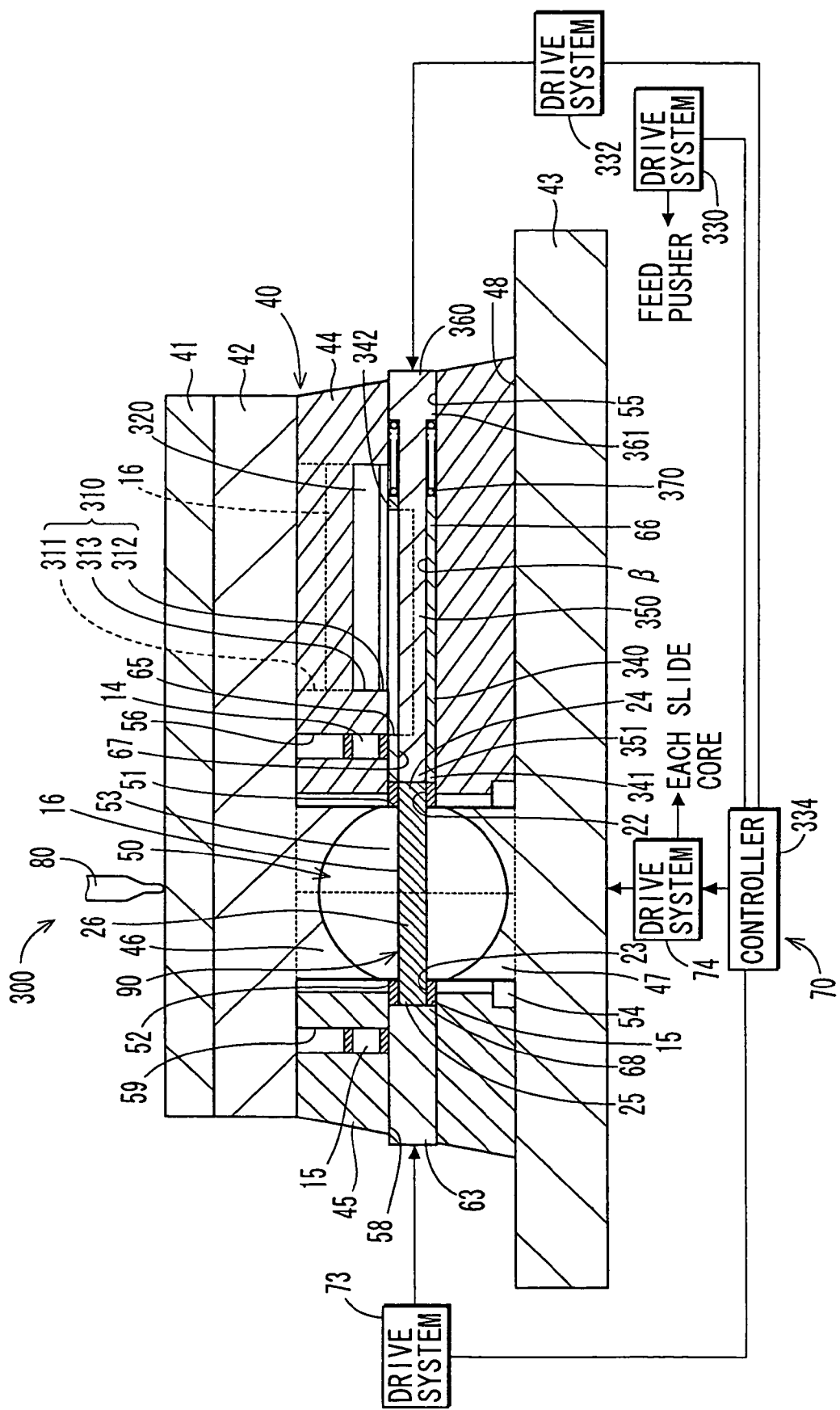
FIG. 21 is a cross sectional view of the insert molding apparatus of the fifth embodiment.

As shown in FIG. 16, when each of the first pusher 340, the second pusher 350 and the common pusher 360 is held in its backward end position, the space immediately below the feed portion 312 is opened, so that feeding of the shaft 16 to the second feed position β through the window 65 of the first pusher 340 is permitted. In contrast, as shown in FIGS. 20 and 21, when each of the first pusher 340, the second pusher 350 and the common pusher 360 is located on the forward side of backward end position, the base end portion 342 of the first pusher 340 and the resilient member 370 are placed below the feed portion 312, so that feeding of the shaft 16 to the second feed position β is prevented.

The controller 334 controls the second drive system 332 to drive the first pusher 340, the second pusher 350 and the common pusher 360 in the forward direction and the backward direction. Furthermore, the controller 334, which is electrically connected to the feed drive system 330, controls the operation of the feed drive system 330 in addition to the operations of the second to fourth drive systems 332, 73, 74. Through the control operation of the feed drive system 330, the forward movement and the backward movement of the feed pusher 320 are controlled.

In the fifth embodiment, the first pusher 340, the common pusher 360, the resilient member 370 and the second drive system 332 correspond to a first urging means. Also, the third pusher 63 and the third drive system 73 correspond to another type of first urging means. Furthermore, the first pusher 61 corresponds to a first urging member, and the third pusher 63 corresponds to another type of first urging member. The second pusher 350 and the common pusher 360 correspond to a second urging means. The second pusher 350 corresponds to a second type urging member. Furthermore, the first to third feed holes 56, 310, 59, the feed pusher 320 and the feed drive system 330 correspond to a feed means, and the second feed hole 310 corresponds to a second type holding hole.

Next, the operation of the insert molding apparatus 300 will be described.

In the insert molding apparatus 300, when the die arrangement 40 is placed in the fully opened state, the first to third pushers 340, 350, 63 and the common pusher 360 are respectively placed in its forward end position. In the fully opened state of the die arrangement 40, when the bearings 14, 15 and the shafts 16 are supplied to the feed holes 56, 59 and the holding portion 311, the controller 334 drives the fourth drive system 74 to close the die arrangement 40. The controller 76 performs it automatically or upon receiving a corresponding command from an operator.

Figure 19:
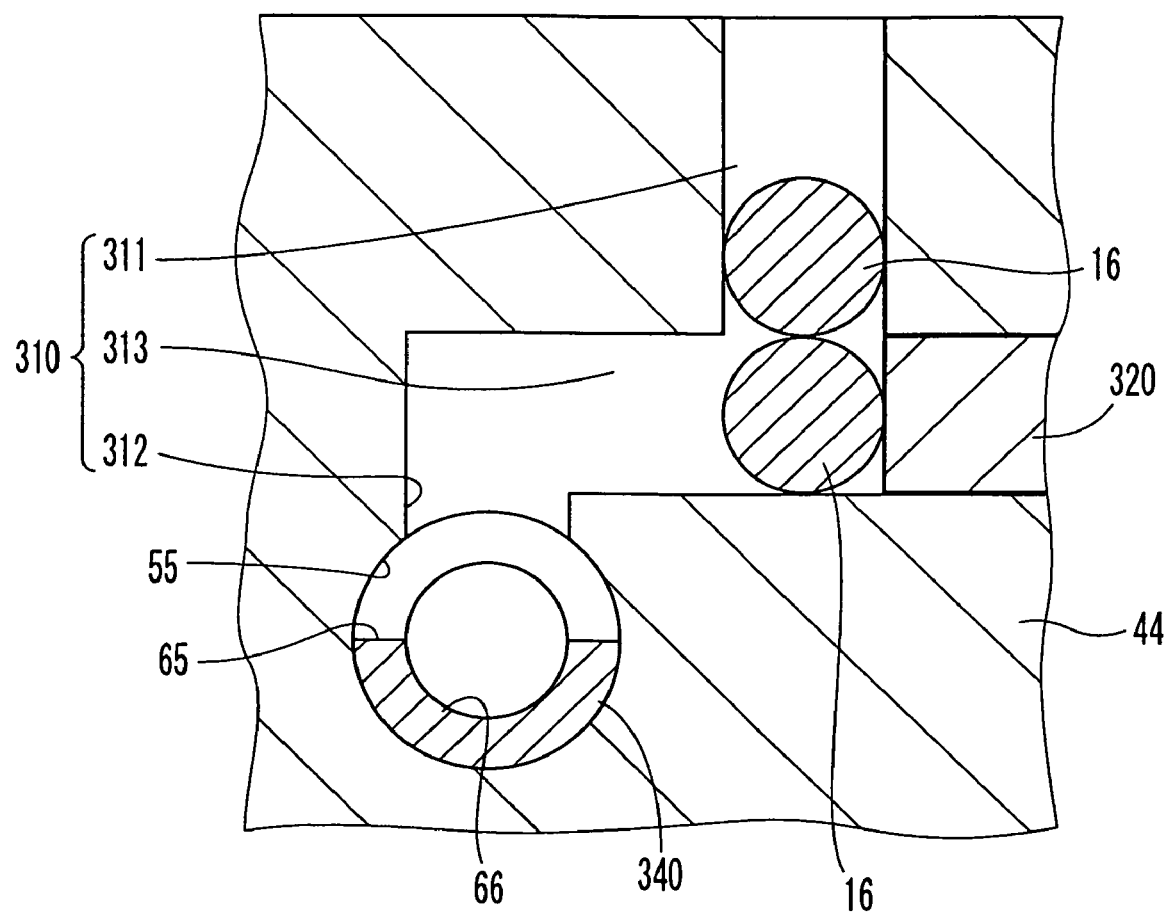
FIG. 19 is another cross sectional view of the insert molding apparatus of the fifth embodiment similar to FIG. 17.

Upon completion of the die closing drive operation of the die arrangement 40, the controller 334 controls the second and third drive systems 332, 73 to drive the first to third pushers 340, 350, 63 and the common pusher 360 in its backward direction. When each of the pushers 340, 350, 63, 360 reaches its backward end position shown in FIG. 16 through the backward drive operation, the space immediately below the first feed hole 56 and the space immediately below the third feed hole 59 are opened, so that the bearings 14, 15 are automatically fed to the first and third feed positions α, γ, respectively. Next, the controller 334 controls the feed drive system 330 to drive the feed pusher 320 in the backward direction. When the feed pusher 320 reaches its backward end position through the backward drive operation, as shown in FIG. 19, the shaft 16 is fed from the holding portion 311 to the guide hole 313. Next, the controller 334 controls the feed drive system 330 to drive the feed pusher 320 in the forward direction. When the feed pusher 320 reaches the forward end position through the forward drive operation, the space immediately below the feed portion 312 is opened, so that the shaft 16 is automatically fed from the guide portion 313 to the second feed position β through the feed portion 312, as indicated by a dot-dot-dash line and a blank arrow in FIG. 17.

Upon completion of the forward drive operation of the common pusher 320, the controller 334 controls the second and third drive systems 332, 73 to drive the first to third pushers 340, 350, 63 and the common pusher 360 in its forward direction. Due to the forward drive operation, the first and third pushers 340, 63 push the bearings 14, 15, respectively, to the corresponding receiving portion 51, 52. When the bearing 14 is transferred in this manner, the shaft 16 is pushed by the distal end portion 351 of the second pusher 350, so that the shaft 16 is transferred toward the first receiving portion 51 while the shaft 16 is kept received in the first pusher 340. Thus, as shown in FIG. 20, when the bearing 14 is received in the first receiving portion 51 after reaching of the first pusher 340 to the forward end position, the shaft 16 is not yet positioned in the cavity 50, as shown in FIG. 20. After the first pusher 340 reaches the forward end position, the controller 334 controls the second drive system 332 to apply the forward drive force to the common pusher 360. At this time, the first pusher 340 is engaged with the cavity defining portions 46, 47 of the plates 42, 43 through the bearing 14 located in the first receiving portion 51. Due to the drive force applied from the second drive system 332, the second pusher 350 and the common pusher 360 are driven in the forward direction while the resilient member 370 is compressed. As a result, the second pusher 350 pushes the shaft 16 to the cavity 50. Therefore, the journal portions 24, 25 of the shaft 16 are inserted into the holes 22, 23, respectively, of the bearings 14, 15 located in the first and second receiving portions 51, 52, respectively.

Therefore, the assembling of the composite insert 90 and the installation and positioning of the composite insert 90 in the cavity 50 are completed.

As discussed above, according to the fifth embodiment, upon pushing of the bearings 14, 15 in the axial direction of the holes 22, 23 of the bearings 14, 15, which are arranged coaxial to the first and second through holes 55, 58, the shaft 16 is pushed in the axial direction of the journal portions 24, 25, which are coaxially arranged in the first through hole 55. Thus, the journal portions 24, 25 of the shaft 16 are axially overlapped with the holes 22, 23 of the bearings 14, 15 located in the cavity 50 and are received in the holes 22, 23 of the bearings 14, 15. As a result, even in the fifth embodiment, the assembling operation of the composite insert 90 can be performed without using a separate device, which is different from the insert molding apparatus 300 in the fully closed state of the die arrangement 40.

Furthermore, in the fifth embodiment, the first pusher 340 and the second pusher 350 are driven by the common second drive system 332. Thus, the number of components and the costs of the insert molding apparatus 300 can be reduced.

The various embodiments of the present invention have been described. However, the present invention is not limited to the above embodiments.

For example, the first pusher 61, 340 and the third pusher 63, 160 of the first to fifth embodiments may have a structure similar to that of the second pusher 120 of the second embodiment, i.e., the structure, in which the first pusher 61, 340 and the third pusher 63, 160 engage the bearings 14, 15 to control the orientations of the bearings 14, 15.

Furthermore, the first to third feed holes 56, 57, 59 of the first to fourth embodiments and the first and third feed holes 56, 59 of the fifth embodiment may have another type of structure, which corresponds to that of the second feed hole 310 of the fifth embodiment, i.e., the structure in which the insert element held by the holding portion 311 is fed to the straight hole by the action of the feed pusher 320 and the gravity.

Furthermore, in the first to fifth embodiments, there may be used another type of die arrangement 40 where the first plate 41 is eliminated, and the position of the second plate 42 is secured. In the first to fifth embodiments, there may be used another type of die arrangement 40 where the first and second slide cores 44, 45, in which the first and second through holes 55, 58 are respectively provided, are formed as plates, and the second and third plates 42, 43 are formed as slide cores, respectively.

Furthermore, the first embodiment may be modified in a manner similar to the fourth embodiment. That is, the first and third pushers 61, 63 may be driven in the forward direction to transfer the bearings 14, 15 to the cavity 50 after the second pusher 62 is driven in the forward direction to transfer the shaft 16 to the cavity 50. Furthermore, the second embodiment may be modified in a manner similar to the fourth embodiment. That is, the first and third pushers 61, 63 may be driven in the forward direction to transfer the bearings 14, 15 to the cavity 50 after the second pusher 120 is driven in the forward direction to transfer the shaft 16 to the cavity 50. Furthermore, the second embodiment may be modified in a manner similar to the fourth embodiment. That is, the first and third pushers 61, 63 may be driven in the forward direction to transfer the bearings 14, 15 to the cavity 50 after the redriving of the second pusher 120 in the forward direction and the driving of the guide pusher 170 in the backward direction for transferring the shaft 16 to the cavity 50.

Furthermore, in the fifth embodiment, the characteristic structure of the second or third embodiment may be used.

In addition, besides the molding process of the throttle device 10, the present invention is also applicable to another molding process, in which the composite insert that has the journal portion of the second insert fitted into the hole of the first insert.

Sixth Embodiment

Figure 23:
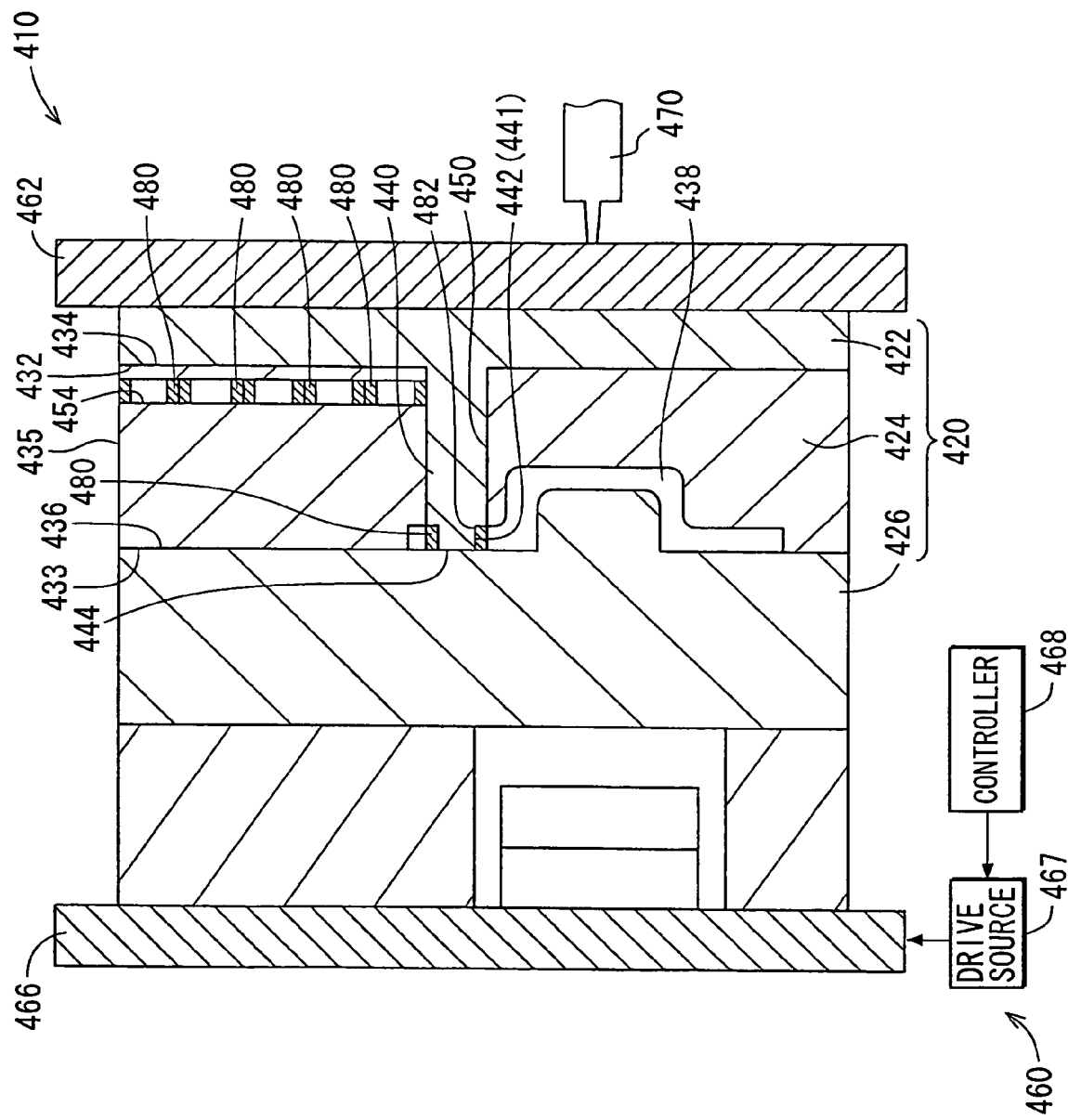
FIG. 23 is a cross sectional view of the insert molding apparatus of the sixth embodiment.
Figure 24:
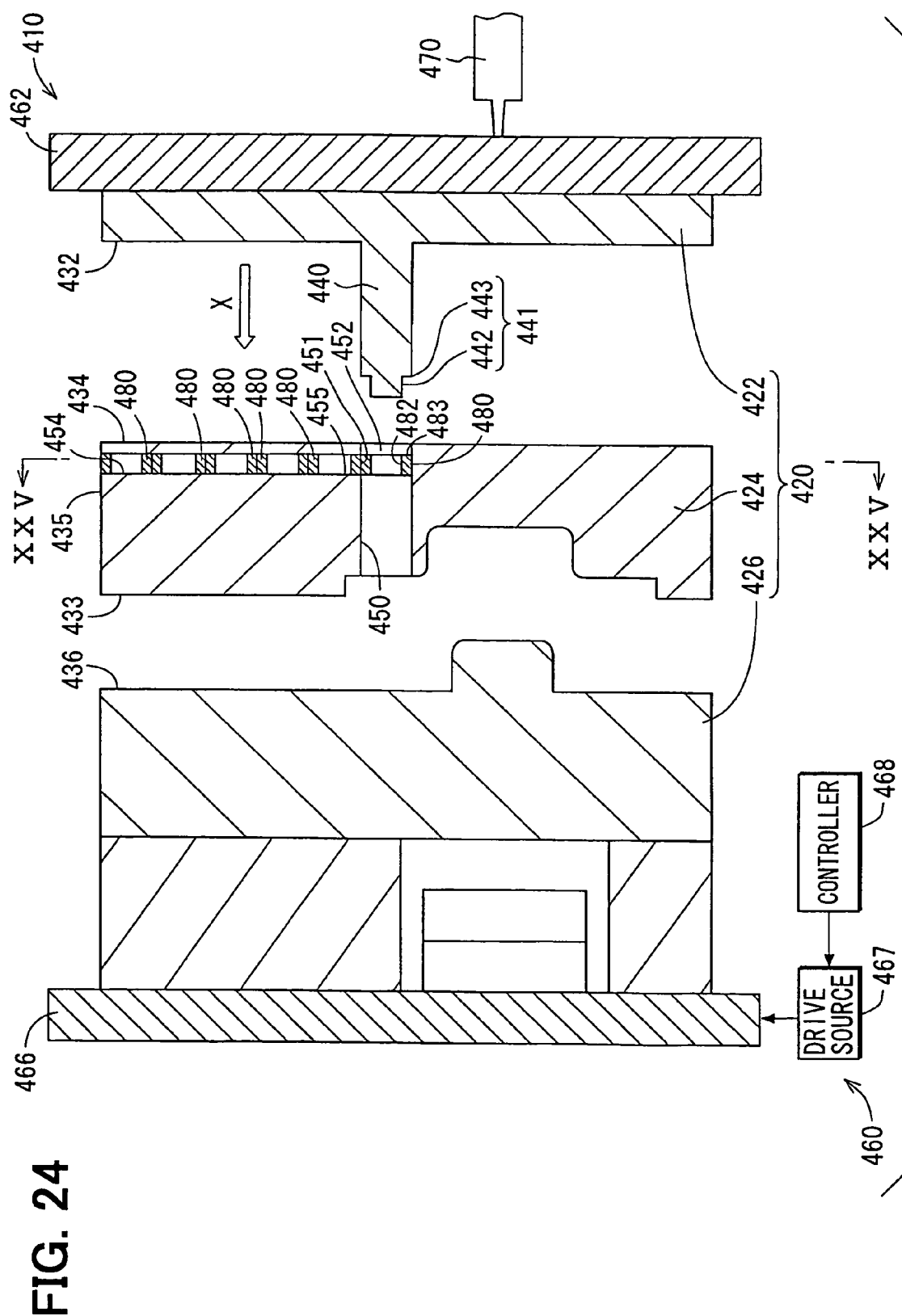
FIG. 24 is a cross sectional view of the insert molding apparatus of the sixth embodiment.

An insert molding apparatus according to a sixth embodiment of the present invention will be described with reference to FIGS. 23 and 24. FIG. 23 shows a fully closed state of the die arrangement 420 of the insert molding apparatus 410, and FIG. 24 shows a fully opened state of the die arrangement 420 of the insert molding apparatus 410. In FIGS. 23 and 24, a top-bottom direction and a right-left direction correspond to a vertical direction and a horizontal direction, respectively, of the insert molding apparatus 410.

The insert molding apparatus 410 includes the die arrangement 420, a die opening and closing device (die drive means) 460 and an injection device 470. The die opening and closing device 460 performs the die opening drive operation and the die closing drive operation. The injection device 470 injects the molding material into the die arrangement 420.

The die arrangement 420 includes a plurality of plates 422, 424, 426, which serve as die bodies of the present invention and are engaged with one another in the die closing drive operation performed by the die opening and closing device 460. The first plate 422 is arranged such that the second plate 424 is clamped between the first plate 422 and the third plate 426. The first plate 422 is installed to and secured to a stationary block 462 of the die opening and closing device 460 on the side opposite from a die engaging surface 432 of the first plate 422, which engages the second plate 424. The second plate 424 slides along guide pins (not shown), which are provided on the first plate 422, and is movable toward and away from the first plate 422. The movement of the second plate 424 toward the first plate 422 is achieved at the time of closing the die arrangement 420 by the die opening and closing device 460. Thus, in the die closing drive operation of the die arrangement 420, the relative moving direction X of the first plate 422 and thereby of a pusher 440 (hereinafter, simply referred to as "the relative moving direction X of the first plate 422") relative to the second plate 424 generally coincides with the horizontal direction, which is indicated by a blanked arrow in FIG. 24. The third plate 426 is installed to a movable block 466 of the die opening and closing device 460 on a side opposite from a die engaging surface 436 of the third plate 426, which engages the second plate 424. The third plate 426 is movable toward and away from the second plate 424. In the fully closed state of the die arrangement 420 shown in FIG. 23, the second plate 424 and the third plate 426 define a cavity 438 between the die engaging surface 433 of the second plate 424 and the die engaging surface 436 of the third plate 426.

Here, the first plate 422 corresponds to a first die body, and the second plate 424 corresponds to a second die body.

The pusher 440 is formed integrally in the first plate 422 to protrude from the die engaging surface 432 of the first plate 422, which engages the second plate 424, in the relative moving direction X of the first plate 422. The pusher 440 is formed into a cylindrical body that extends in the relative moving direction X of the first plate 422. A protruding end portion of the pusher 440 forms a stepped portion 441, which is stepped such that a diameter of the stepped portion 441 is decreased toward its distal end. A small diameter part 442 of the stepped portion 441 has the outer diameter, which allows coaxial insertion of the small diameter part 442 into a hole 482 of an annular insert 480 that is similar to the bearings 14-15 of the first to f if th embodiment and is used in the insert molding. A large diameter part 443 of the stepped portion 441 has an outer diameter that is generally the same as that of the insert 480. In this way, when the small diameter part 442 of the stepped portion 441 is received in the hole 482 of the insert 480, the large diameter part 443 of the stepped portion 441 is engageable with the end surface 483 of the insert 480, which forms an outer peripheral part of the insert 480 located radially outward of the hole 482. A base end side of the pusher 440, which is located on a base end side of the stepped portion 441, has an outer diameter that is generally the same as the outer diameter of the large diameter part 443 of the stepped portion 441.

A through hole 450 is formed in the second plate 424. The through hole 450 extends linearly in the relative moving direction X of the first plate 422 in a coaxial manner with respect to the pusher 440. The through hole 450 is a cylindrical hole, which has a circular cross section in a plane perpendicular to the axial direction of the through hole 450. The through hole 450 has an inner diameter, which enables coaxial insertion of a base end side part of the pusher 440, which is located on a base end side of the small diameter part 442 of the stepped portion 441, and the insert 480 into the through hole 450. The through hole 450 has an axial length that is generally the same as an axial length of the base end side part of the pusher 440, which is located on the base end side of the small diameter part 442 of the stepped portion 441 of the pusher 440. The through hole 450 connects between the die engaging surface 434 of the second plate 424, which engages the first plate 422, and the die engaging surface 433 of the second plate 424, which engages the third plate 426. As discussed above, in the fully closed state of the die arrangement 420, the cavity 438 is defined, i.e., is formed between the die engaging surface 433 of the second plate 424 and the die engaging surface 436 of the third plate 426, so that the through hole 450 connects between the die engaging surface 434 of the second plate 424 and the cavity 438.

A receiving hole 454 is formed in the second plate 424 to linearly extend generally in the vertical direction. The receiving hole 454 shows the rectangular cross section in a plane perpendicular to an axial direction of the receiving hole 454. The receiving hole 454 has an inner size that enables insertion of the insert 480, which is oriented in such a manner that a radial direction and an axial direction of the insert 480 generally coincide with the vertical direction and the relative moving direction X of the first plate 422, respectively. Furthermore, the receiving hole 454 has the axial length, which is several times (here, five times) greater than the outer diameter of the insert 480. The receiving hole 454 connects between a first plate 222 side end portion 451 of the through hole 450 and an outer peripheral surface 435 of the second plate 424.

Figure 25:
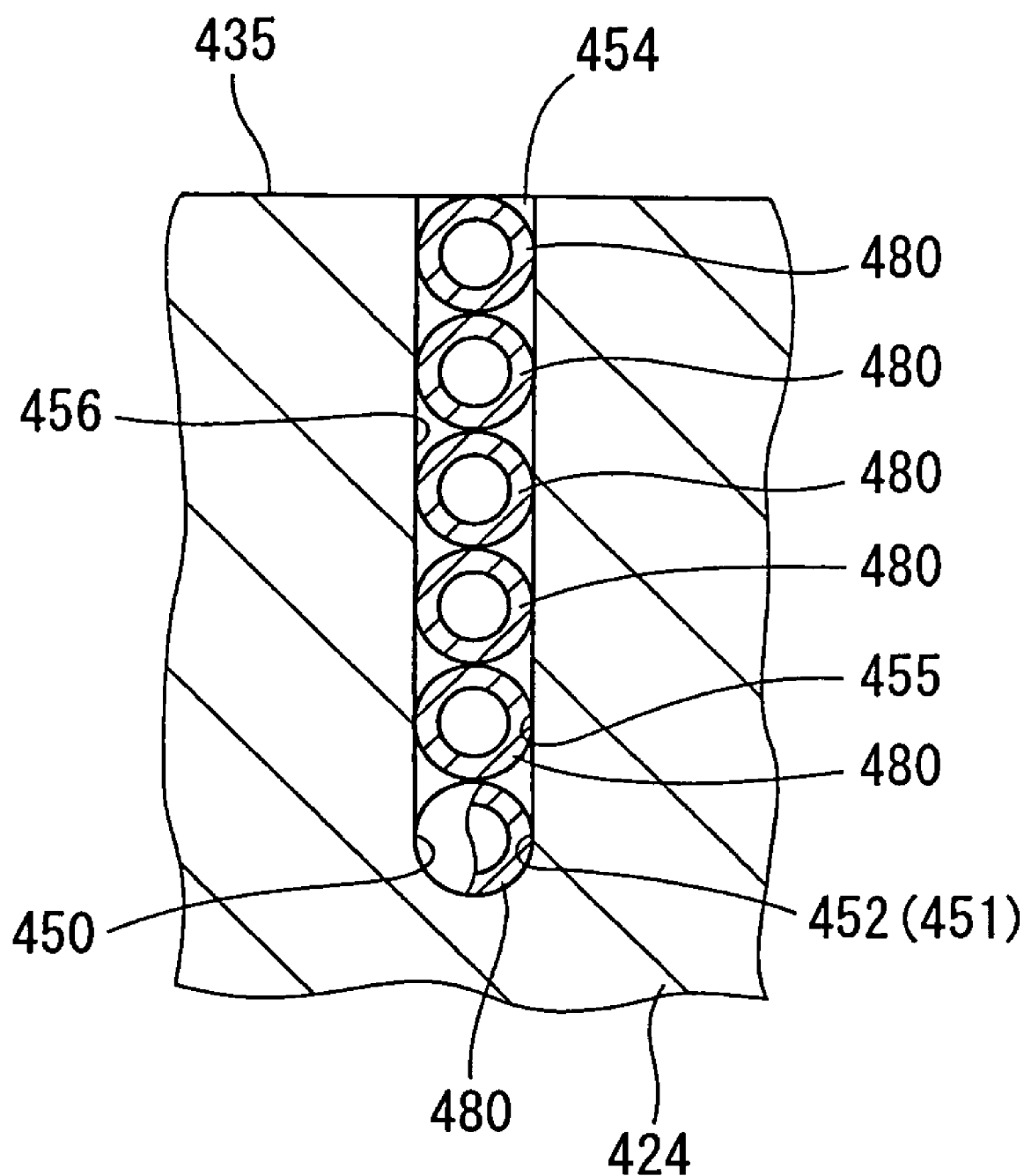
FIG. 25 is cross sectional view taken along line XXV-XXV in FIG. 24.

As shown in FIGS. 23-25, the receiving hole 454 can receive the inserts 480 from the outer peripheral surface 435 side of the second plate 424. The receiving hole 454 receives the supplied inserts 480 in such a manner that the inserts 480 are aligned generally in the vertical direction, and an inner wall 456 of the receiving hole 454 holds and guides the respective inserts 480. The lowest insert 480, which has reached a lower end portion 455 of the receiving hole 454 and is thus considered to be the lowest one of the aligned inserts 480, is automatically fed by the gravity to the end portion 451 of the through hole 450 that is located immediately below the lowest inert 480 when the previously fed insert 480 or the pusher 440 is removed from the end portion 451 of the through hole 450. At the time of automatic insertion, an outer peripheral part of the insert 480 is guided by an inner wall 452 of the end portion 451 of the through hole 450 and is positioned to the end portion 451.

In the present embodiment, the receiving hole 454 and the end portion 451 of the through hole 450 correspond to a feed means. The receiving hole 454 corresponds to a holding means, and the end portion 451 of the through hole 450 corresponds to a guide means. The position, at which the insert 480 is positioned in the end portion 451 of the through hole 450 immediately below the receiving hole 454, corresponds to an installation position (feed position). The inner wall 452 of the end portion 451 of the through hole 450 corresponds to a guide wall, which surrounds the installation position of the insert 480.

The die opening and closing device 460 includes the stationary block 462, the movable block 466, a drive source 467 and a controller 468. The stationary block 462 positions and secures the first plate 422. The movable block 466 drives the third and second plates 426, 424 by conducting the drive force generated by the drive source 467 to the third plate 426 and the second plate 424. The controller 468 includes an electric circuit, such as a microcomputer, and is electrically connected to the drive source 467. The controller 468 controls the operation of the drive source 467 to control the die opening drive operation and the die closing drive operation of the die arrangement 420.

The die opening and closing device 460 corresponds to a die opening and closing means.

The injection device 470 is electrically connected to the controller 468. Furthermore, according to an instruction of the controller 468, the injection device 470 injects the molding material into the die arrangement 420, which is in the fully closed state. The injected molding material is filled into the cavity 438 through a runner and a gate (not shown), which are formed in the first and second plates 422, 424. The molding material may include a molten resin material, a molten metal material and/or the like.

Next, the operation of the insert molding apparatus 410 will be described.

As shown in FIG. 24, in the fully opened state of the die arrangement 420, when the inserts 480 are supplied into the receiving hole 454 of the second plate 424, the controller 468 of the die opening and closing device 460 initiates the die closing drive operation of the die arrangement 420 automatically or upon receiving a corresponding command from an operator.

In the die closing drive operation of the die arrangement 420, the drive force of the drive source 467 is conducted from the movable block 466 to the third plate 426, so that the third plate 426 is driven toward the second plate 424. Due to the movement of the third plate 426 toward the second plate 424, the third plate 426 is engaged with the second plate 424. Thus, the cavity 438 is formed between the die engaging surface 436 of the third plate 426 and the die engaging surface 433 of the second plate 424.

Figure 22:
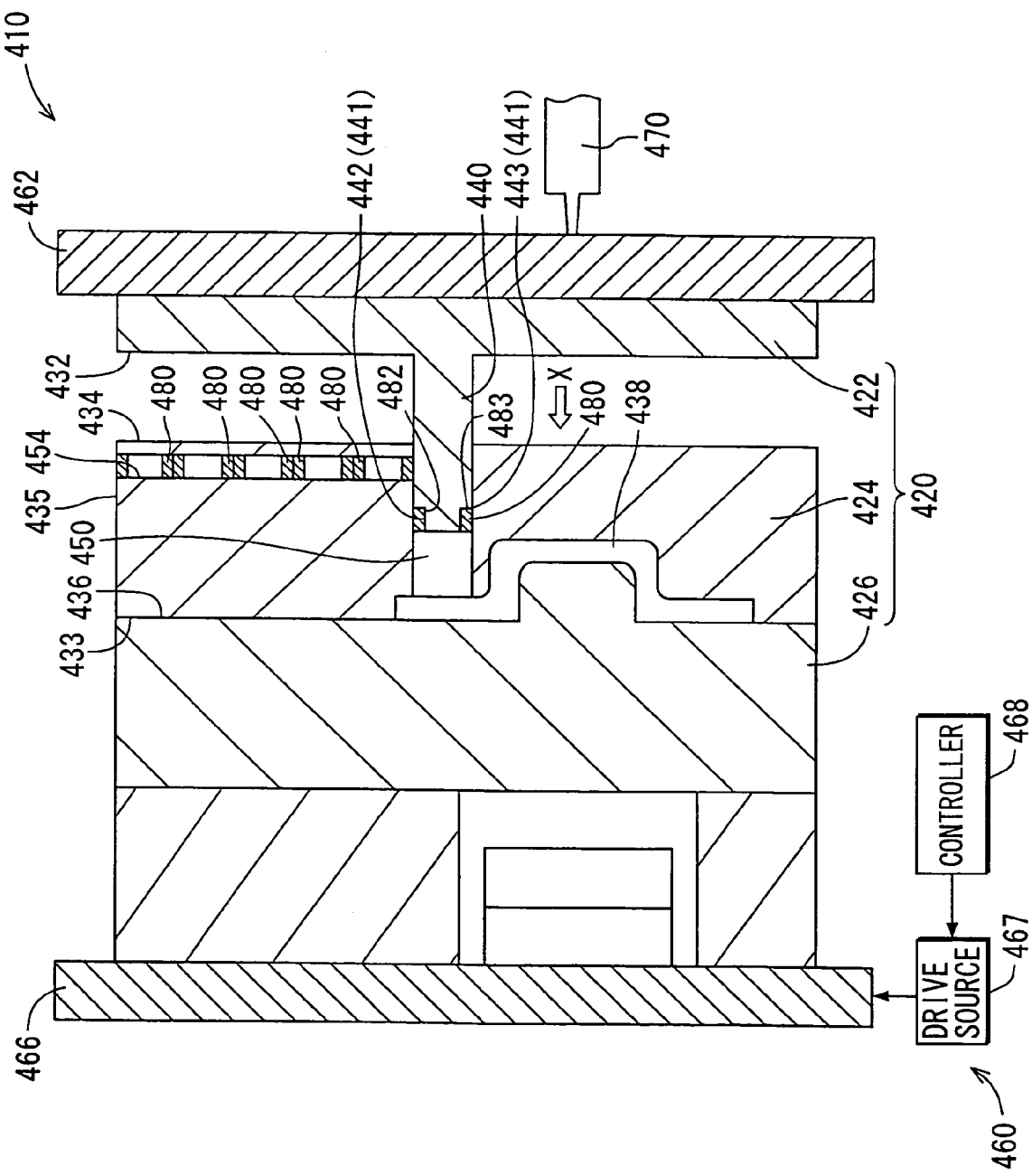
FIG. 22 is a cross sectional view of an insert molding apparatus according to a sixth embodiment.

Thereafter, in the die closing drive operation of the die arrangement 420, the drive force of the drive source 467 is sequentially conducted from the movable block 466 to the third plate 426 and to the second plate 424, so that these plates 426, 424 are driven integrally toward the first plate 422. Thus, the pusher 440 is inserted into the end portion 451 of the through hole 450 in such a manner that the small diameter part 442 of the stepped portion 441 serves as a leading end of the pusher 440. Then, the small diameter part 442 of the stepped portion 441 is inserted into the hole 482 of the insert 480, which is positioned in the end portion 451 of the through hole 450. Also, the large diameter part 443 of the stepped portion 441 engagers the end surface 483 of the insert 480. Thereafter, the large diameter part 443 of the stepped portion 441 urges the end surface 483 of the insert 480 in the relative moving direction X of the first plate 422. Thus, as shown in FIG. 22, the insert 480 and the pusher 440 are slid toward the cavity 438 in the through hole 450. Then, as shown in FIG. 23, when the second plate 424 is engaged with the first plate 422, the insert 480 is placed in a predetermined position in the cavity 438 while the insert 480 is engaged with the small diameter part 442 of the stepped portion 441. At this time, a distal end surface 444 of the stepped portion 441 tightly engages the die engaging surface 436 of the third plate 426.

When the die closing drive operation of the die arrangement 420 ends, the injection device 470 injects the molding material into the die arrangement 420, to which the die clamping force is applied through the control operation of the drive source 567 by the controller 468. In this way, the molding material, which is injected from the injection device 470, is filled in the cavity 438 to surround the insert 480, which is received in the cavity 438. At this time, the through hole 450 is closed by the large diameter part 443 of the stepped portion 441, which is inserted into the through hole 450. Thus, the molding material, which is filled in the cavity 438, will not leak outwardly through the through hole 450.

After the molding material, which is filled in the cavity 438, is cooled and is thus solidified, the controller 468 initiates the die opening drive operation of the die arrangement 420.

Figure 26:
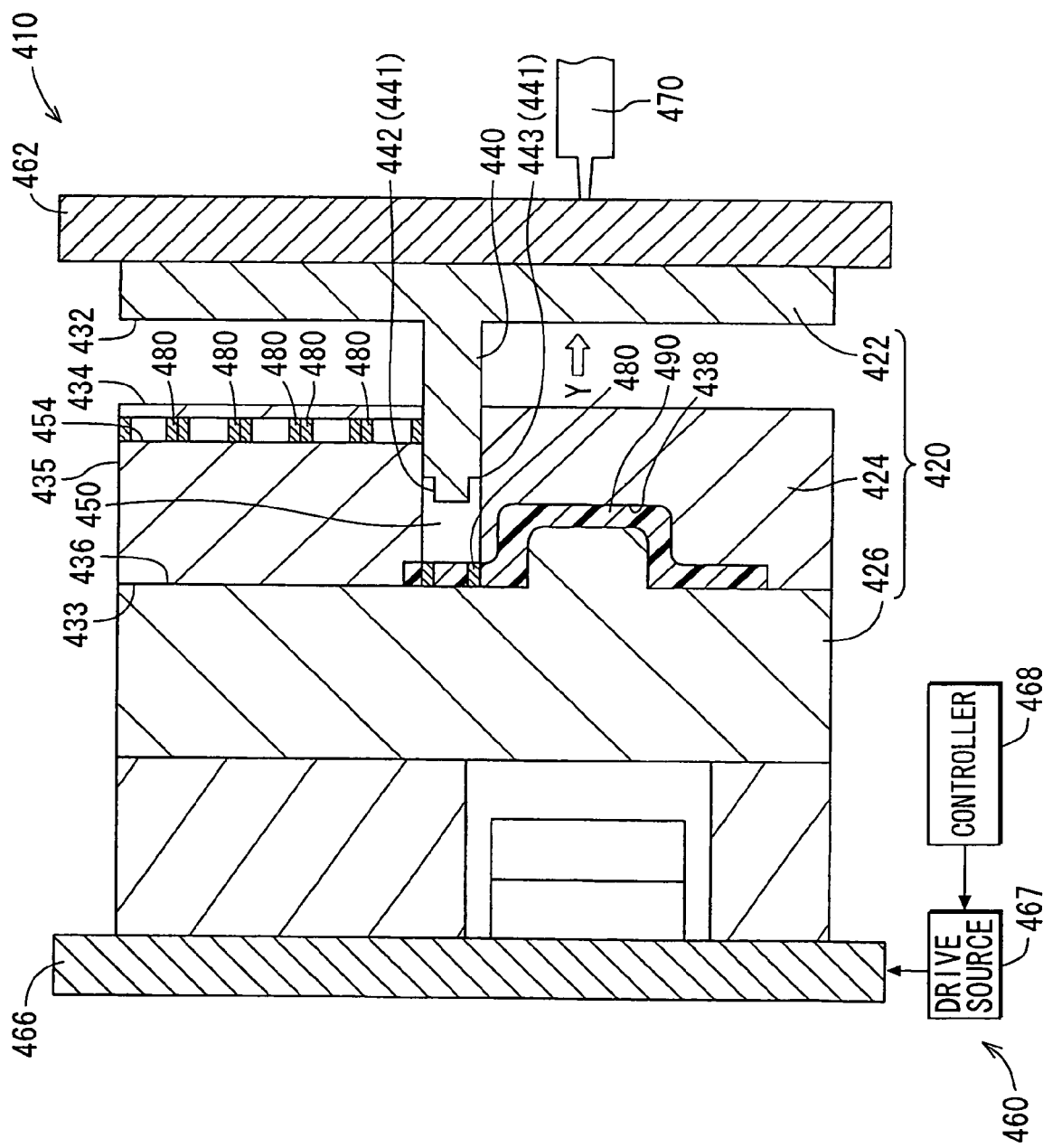
FIG. 26 is a cross sectional view of an insert molding apparatus of the sixth embodiment.

Specifically, in the die opening drive operation of the die arrangement 420, the drive force of the drive source 467 shown in FIG. 26 is conducted from the movable block 466 to the third plate 426 and is also conducted to the second plate 424 through an insert molded product 490 located in the cavity 438. Thus, the plates 426, 424 are driven away from the first plate 422. Therefore, the pusher 440 is slid in an opposite direction Y, which is opposite from the relative moving direction X of the first plate 422, in the through hole 450. As a result, as shown in FIG. 26, the small diameter part 442 of the stepped portion 441 is removed from the insert 480 of the insert molded product 490, and thereafter the pusher 440 is entirely removed from the through hole 450. When the pusher 440 is removed from the through hole 450, the lowest one of the inserts 480, which are received in the receiving hole 454, is automatically fed to and is positioned in the end portion 451 of the through hole 450. Although not depicted, when the pusher 440 is removed from the through hole 450, a solidified material, which is filled in the runner and the gate formed in the plates 422, 424, appears between the first plate 422 and the second plate 424. Then, the solidified material is removed by the action of, for example, a runner lock pin.

Thereafter, in the die opening drive operation of the die arrangement 420, movement of the second plate 424 is limited by the guide pin, and movement of the third plate 426 is continued. Thus, the third plate 426 is moved away from the second plate 424. In this way, the cavity 438 is opened while the insert molded product 490 is held by the third plate 426. The insert molded product 490, which is held by the third plate 426, is removed from the third plate 426 by the action of, for example, the ejector pin and becomes the final product.

In the case of the above insert molding apparatus 410, at the time of die closing drive operation of the die arrangement 420, the pusher 440 urges the insert 480, which is supplied into the through hole 450, in the relative moving direction X of the first plate 422. Thus, the insert 480 is transferred in the through hole 450 toward the cavity 438. Thus, the insert 480 can be simultaneously transferred to the cavity 438 at the time of the die closing drive operation of the die arrangement 420, thereby resulting in an improved production efficiency. Furthermore, the insert 480 is transferred by the action of the pusher 440, which is provided in the die arrangement 420. Thus, the transferring of the insert 480 can be controlled only by controlling the die closing drive operation of the die arrangement 420. As a result, the costs involved in such a control operation can be reduced.

Furthermore, in the case of the insert molding apparatus 410, at the time of the die closing drive operation, the insert 480, which is engaged with the small diameter part 442 of the stepped portion 441 of the pusher 440, is urged by the large diameter part 443 of the stepped portion 441, so that the insert 480 is slid in the through hole 450. In this way, the insert 480 is transferred to the cavity 438 while the proper orientation of the insert 480 is maintained. Thus, the insert 480 will be placed in the predetermined position of the cavity 438 at the proper orientation without causing a damage to the die arrangement 420. Thus, the insert molded product, in which the insert 480 is accurately embedded, can be obtained. This will result in the improved product quality.

Furthermore, in the case of the insert molding apparatus 410, at the time of the die closing drive operation of the die arrangement 420, the pusher 440 is inserted into and is slid along the through hole 450. In this way, the movement of the pusher 440 is stabilized, and the smooth die closing drive operation of the die arrangement 420 is achieved.

Furthermore, in the case of the insert molding apparatus 410, the lowest one of the inserts 480, which are received in the receiving hole 454 and are aligned generally in the vertical direction, is guided by the inner wall 452 of the end portion 451 of the through hole 450 and is transferred to the end portion 451 by the gravity. In this way, the insert 480 is automatically fed to and is positioned in the through hole 450. Thus, it is not required to postpone the die closing drive operation of the die arrangement 420 until the completion of the transferring of the insert 480. As a result, the production efficiency is improved.

Seventh Embodiment

Figure 27:
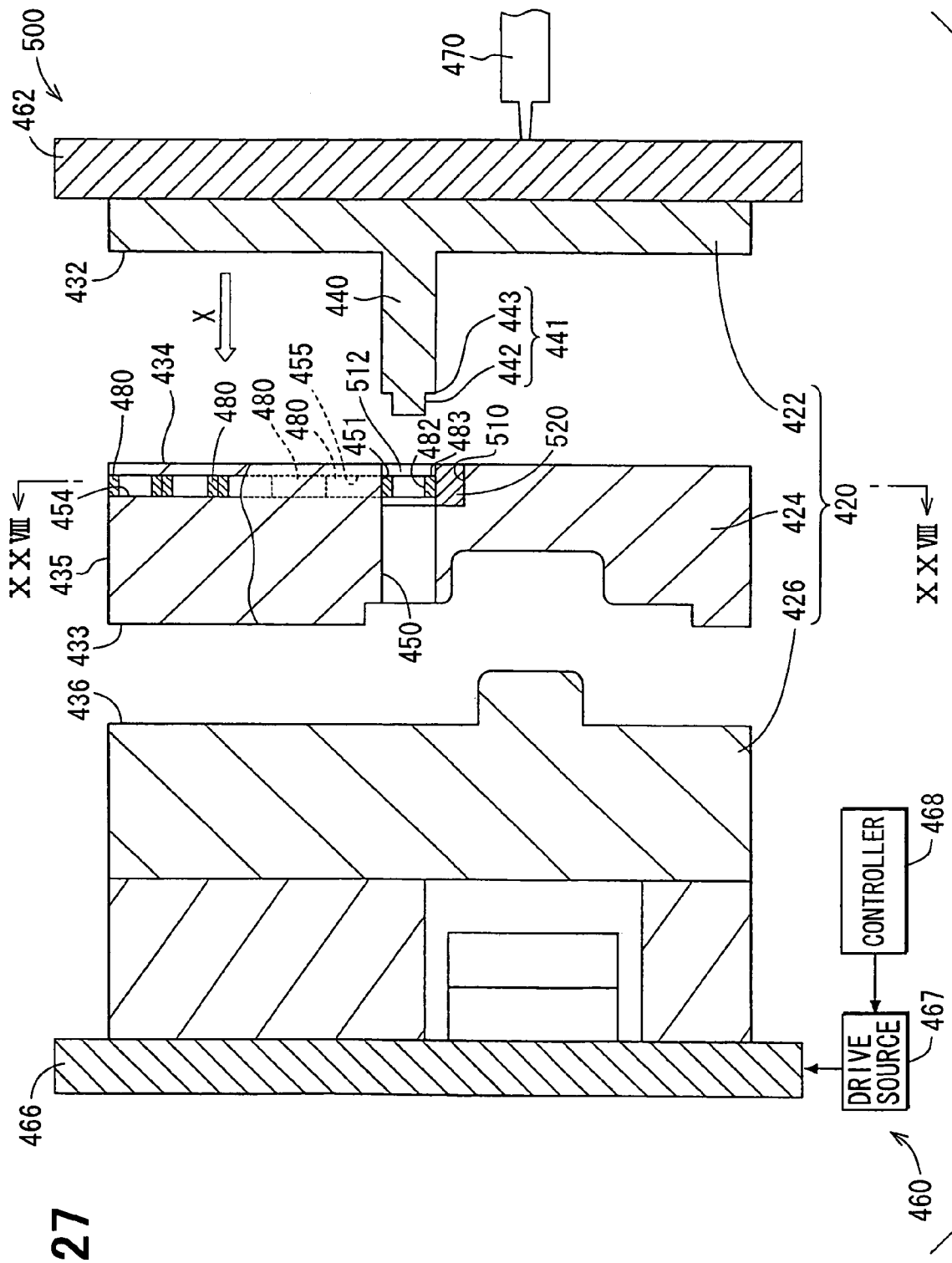
FIG. 27 is a cross sectional view of an insert molding apparatus according to a seventh embodiment.
Figure 28A:
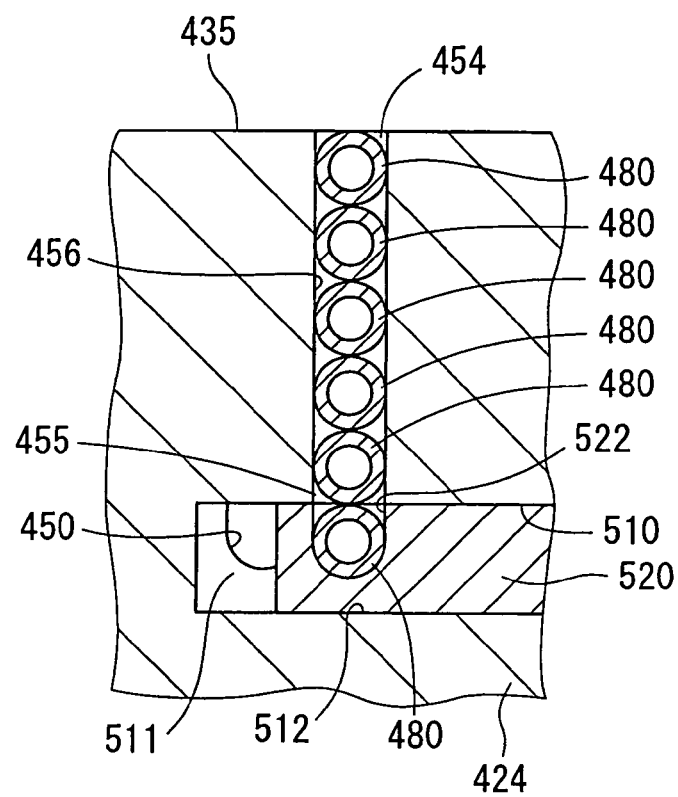
FIG. 28A is a cross sectional view taken along line XXVIII-XXVIII in FIG. 27 showing a movable body in a first position.
Figure 28B:
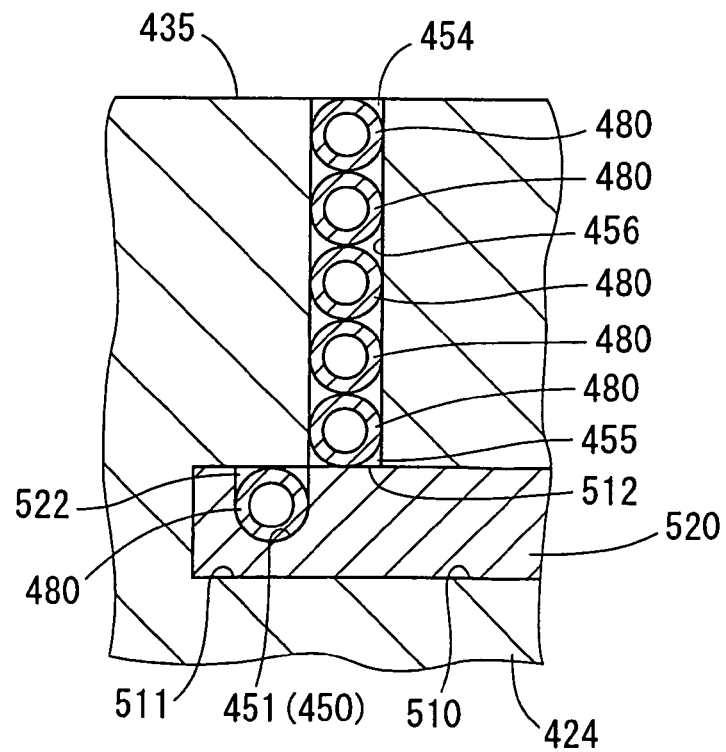
FIG. 28B is a cross sectional view taken along line XXVIII-XXVIII in FIG. 27 showing the movable body in a second position.

An insert molding apparatus according to a seventh embodiment of the present invention will be described with reference to FIGS. 27 to 28B. Components similar to those of the sixth embodiment will be indicated by the same numerals and will not be described for the sake of simplicity.

In the insert molding apparatus 500 of the seventh embodiment, a guide hole 510 is formed to extend linearly in a generally horizontal direction, which is perpendicular to the relative moving direction X of the first plate 422. The guide hole 510 has a rectangular cross section in a plane perpendicular to an axial direction of the guide hole 510. An end portion 511 of the guide hole 510 is connected to the end portion 451 of the through hole 450, and an intermediate portion 512 of the guide hole 510 is connected to the lower end portion 455 of the receiving hole 454. Specifically, in the insert molding apparatus 500, the receiving hole 454 is not directly connected to the through hole 450 and is deviated with respect to the through hole 450 generally in the horizontal direction. Therefore, design freedom of the receiving hole 454 is increased.

A reciprocating movable body 520, which is rectangular rod shaped, is received in the guide hole 510 in such a manner that the movable body 520 is reciprocably slidable in the horizontal direction, which coincides with the axial direction of the guide hole 510. The movable body 520 is reciprocated between a first position of FIG. 28A and a second position of FIG. 28B by a reciprocal drive mechanism (not shown), which is controlled by the controller 468. The movable body 520 includes a recess 522 on a top of the movable body 520. The recess 522 extends on the upper side and also extends on the left and right sides in the width direction. The recess 522 has an inner diameter, which enables insertion of the insert 480 into the recess 522 in such a manner that a radial direction and an axial direction of the insert 480 coincide with the vertical direction and the relative moving direction X of the first plate 422, respectively. In the first position of FIG. 28A, the recess 522 is located immediately below the receiving hole 454. Therefore, the lowest one of the inserts 480, which are received in the receiving hole 454, is automatically fed to the recess 522, which is located immediately below it, by the gravity when the previously fed insert 480 is not present in the recess 522. In contrast, in the second position of FIG. 28B, the recess 522 forms the end portion 451 of the through hole 450. Thus, in the present embodiment, when the movable body 520, which holds the insert 480 in the recess 522, is driven to the second position by the reciprocal drive mechanism, the insert 480 is automatically fed to the end portion 451 of the through hole 450.

In the present embodiment, the receiving hole 454, the guide hole 510 and the movable body 520 correspond to a feed means. Also, the receiving hole 454 corresponds to a holding means. Furthermore, the guide hole 510 and the movable body 520 correspond to a guide means. The position of the recess 522 of the movable body 520 held in the second position corresponds to the installation position (feed position).

Next, the operation of the insert molding apparatus 500 will be described.

In the insert molding apparatus 500, when the die arrangement 420 is fully opened, the movable body 520 is held in the first position, and the insert 480 is held in the recess 522. In this state, when the die closing drive operation of the die arrangement 420 is initiated by the controller 468, the controller 468 controls the reciprocal drive mechanism before the drive operation of the third plate 426 to drive the movable body 520 to the second position, and the recess 522, which holds the insert 480, forms the end portion 451 of the through hole 450. Thereafter, similar to the sixth embodiment, the sole drive operation of the third plate 426 and the integral drive operation of the third and second plates 426, 424 are sequentially performed one after another.

Thus, the insert 480, which receives the action of the pusher 440, is placed in the predetermined position in the cavity 438.

Furthermore, in the insert molding apparatus 500, at the time of die opening drive operation of the die arrangement 420 performed by the controller 468, when predetermined timing is reached after the removal of the pusher 440 from the through hole 450, the controller 468 controls the reciprocal drive mechanism to drive the movable body 520 to the first position. Then, the lowest one of the inserts 480, which are received in the receiving hole 454, is fed into the empty recess 522 that is located immediately below the lowest one of the inserts 480 to prepare for the next molding.

In the case of the insert molding apparatus 500, the lowest one of the inserts 480, which are received in the receiving hole 454 and are aligned generally in the vertical direction, is guided by the gravity to the recess 522 located immediately below the receiving hole 454. Then, this insert 480 is transferred to the end portion 451 of the through hole 450 by the displacement of the recess 522. In this way, the insert 480 is automatically fed to and is positioned in the through hole 450. Thus, the production efficiency is improved.

Eighth Embodiment

Figure 29:
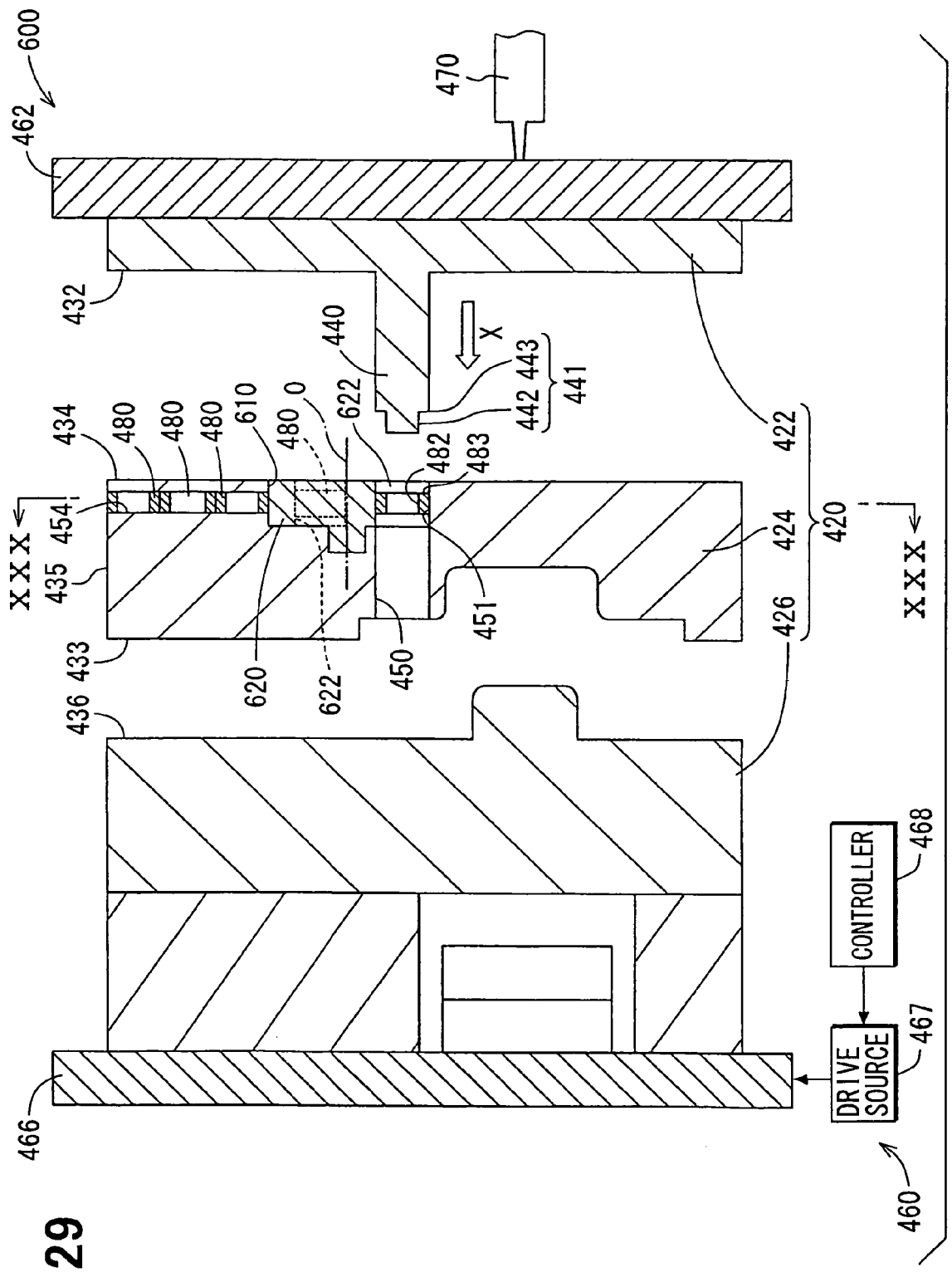
FIG. 29 is a cross sectional view of an insert molding apparatus according to an eighth embodiment.

An insert molding apparatus according to an eighth embodiment of the present invention will be described with reference to FIGS. 29 to 30B. Components similar to those of the sixth embodiment will be indicated by the same numerals and will not be described for the sake of simplicity.

In the insert molding apparatus 600 of the eighth embodiment, a guide hole 610 is formed to extend in a generally horizontal direction, which is perpendicular to the relative moving direction X of the first plate 422. The guide hole 610 is a cylindrical hole, which has a circular cross section in a plane perpendicular to an axial direction of the guide hole 610. A lower end portion 611 of the guide hole 610 is connected to the end portion 451 of the through hole 450, and an upper end portion 612 of the guide hole 610 is connected to the lower end portion 455 of the receiving hole 454. Specifically, in the insert molding apparatus 600, the receiving hole 454 is not directly connected to the through hole 450 and is spaced upward with respect to the through hole 450. Therefore, design freedom of the receiving hole 454 is increased.

A disk shaped rotatable body 620 is inserted into the guide hole 610 in such a manner that the rotatable body 620 is rotatable about an axis O, which coincides with the axis of the guide hole 610 and extends in the generally horizontal direction. The rotatable body 620 is driven by a rotational drive mechanism (not shown), which is controlled by the controller 468, so that the rotatable body 620 is intermittently rotated about the axis O at predetermined intervals (60 degree intervals in this instance). The rotatable body 620 has a plurality (three in this instance) of recesses 622 on an outer peripheral side of the rotatable body 620. Each recess 622 extends on an outer peripheral side and also extends on opposed axial sides. The recesses 622 are arranged at equal intervals about the axis O. Each recess 622 has an inner diameter, which enables insertion of the insert 480 into the recess 622 in such a manner that a radial direction and an axial direction of the insert 480 coincide with the vertical direction and the relative moving direction X of the first plate 422, respectively. The intermittent rotational positions of the rotatable body 620 include a first position of FIG. 30A and a second position of FIG. 30B. In the first position of FIG. 30A, one of the recesses 622 is located immediately below the receiving hole 454. In the second position of FIG. 30B, none of the recesses 622 is located immediately below the receiving hole 454. The first position and the second position appear one after the other in the rotational direction R of the rotatable body 620.

Figure 30A:
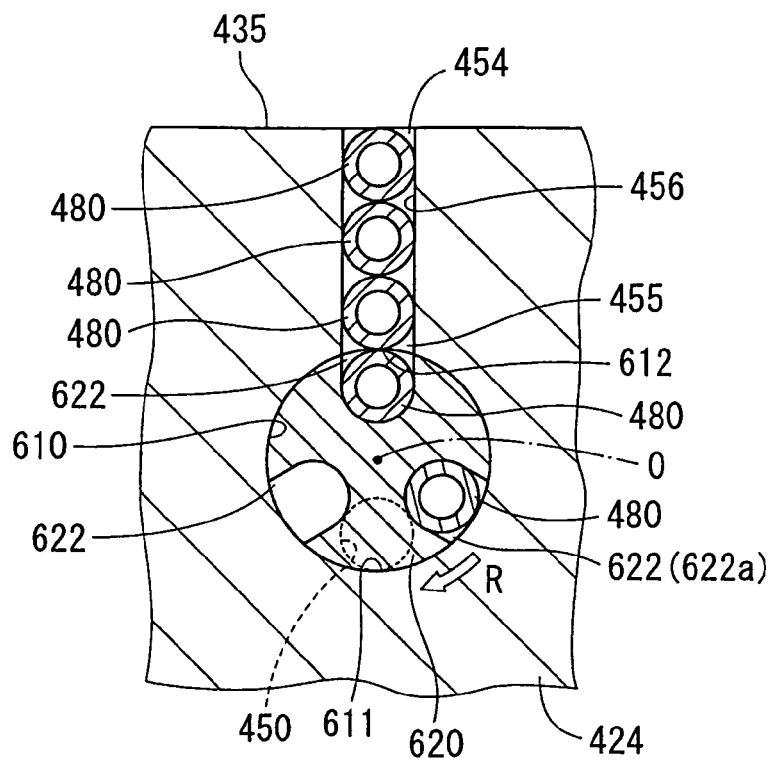
FIG. 30A is a cross sectional view taken along line XXXX-XXX in FIG. 29 showing a rotatable body in a first position.
Figure 30B:
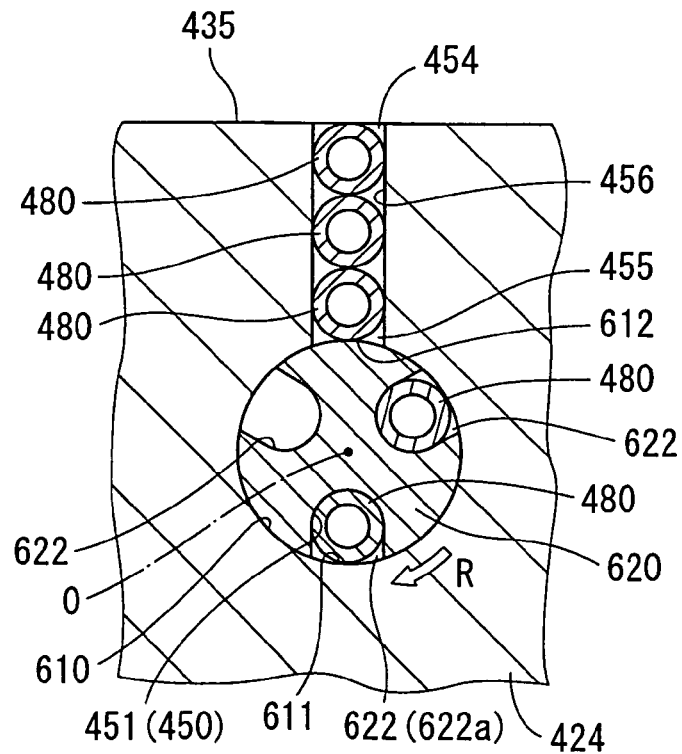
FIG. 30B is a cross sectional view taken along line XXXX-XXX in FIG. 29 showing the rotatable body in a second position.

When the insert 480 is not present in the recess 622, which is positioned at the top 612 of the guide hole 610 upon rotating the rotatable body 620 to the first position of FIG. 30A, the lowest one of the inserts 480, which are received in the receiving hole 454, is automatically fed by the gravity to the recess 622. In contrast, the recess 622, which is positioned at the bottom 611 of the guide hole 610 upon rotation of the rotatable body 620 to the second position of FIG. 30B, forms the end portion 451 of the through hole 450. Thus, in the present embodiment, the insert 480 is automatically fed to the end portion 451 of the through hole 450 when the recess 622, which receives the insert 480, reaches the bottom 611 of the guide hole 610 upon rotation of the rotatable body 620 to the second position through the action of the rotational drive mechanism.

In the present embodiment, the receiving hole 454, the guide hole 610 and the rotatable body 620 correspond to a feed means. Also, the receiving hole 454 corresponds to a holding means. Furthermore, the guide hole 610 and the rotatable body 620 correspond to a guide means. The position of the recess 622 placed in the bottom 611 of the guide hole 610 corresponds to the installation position (feed position).

Next, the operation of the insert molding apparatus 600 will be described.

In the insert molding apparatus 600, when the mold arrangement 420 is fully opened, the rotatable body 620 is held in the first position. Thus, one insert 480 is held in the top recess 622, which reaches the top 612 of the guide hole 610, and another insert 480 is held in the recess 622 (this recess 622 is particularly referred to as "recess 622a"), which is positioned on the leading side of the top recess 622 in the rotational direction R. In this state, when the die closing drive operation of the die arrangement 420 is initiated by the controller 468, the controller 468 controls the rotational drive mechanism before the drive operation of the third plate 426 to drive the rotatable body 620 to the second position, and the recess 622a, which holds the insert 480, forms the end portion 451 of the through hole 450. Thereafter, similar to the sixth embodiment, the sole drive operation of the third plate 426 and the integral drive operation of the third and second plates 426, 424 are sequentially performed one after another. Thus, the insert 480, which receives the action of the pusher 440, is placed in the predetermined position in the cavity 438.

Furthermore, in the insert molding apparatus 600, at the time of die opening drive operation of the die arrangement 420 performed by the controller 468, when predetermined timing is reached after the removal of the pusher 440 from the through hole 450, the controller 468 controls the rotational drive mechanism to drive the rotatable body 620 to the first position. Then, the lowest one of the inserts 480, which are received in the receiving hole 454, is fed into the top empty recess 622 that is located at the top 612 of the guide hole 610 to prepare for the next molding.

In the case of the insert molding apparatus 600, the lowest one of the inserts 480, which are received in the receiving hole 454 and are aligned generally in the vertical direction, is guided by the gravity to the recess 622 located immediately below the receiving hole 454. Then, this insert 480 is transferred to the end portion 451 of the through hole 450 by the displacement of the recess 622. In this way, the insert 480 is automatically fed to and is positioned in the through hole 450. Thus, the production efficiency is improved.

The various embodiments of the present invention have been described. However, the present invention is not limited to the above embodiments.

For example, in the above six to eighth embodiments, the present invention is implemented in the insert molding apparatus 410, 500, 600 for producing the insert molded product, in which the single insert 480 is embedded. The present invention is also applicable to an insert molding apparatus for producing an insert molded product, in which two or more inserts are embedded like in the first to fifth embodiments. In such a case, depending on the number of the inserts, each of the pusher 440, the through hole 450, the movable body 520, the recess 522 of the movable body 520 and the recesses 622 of the rotatable body 620 may be provided in any appropriate number.

Furthermore, in the above sixth to eighth embodiments, the present invention is applied to the insert molding apparatus 410, 500, 600 for producing the insert molded product, in which the annular insert 480 is embedded. The present invention is also applicable to an insert molding apparatus for producing an insert molded product, in which any other one of various shaped inserts other than the annular insert is embedded. In any of these cases, the shape of the pusher may be any one as long as it can urge the insert. Furthermore, the pusher may have an engaging shape that engages the insert or a non-engaging shape that does not engage the insert.

Furthermore, in the above sixth to eighth embodiments, the position of the first plate 422, which serves as the first die body having the integrally formed pusher 440, is fixed, and the second plate 424, which serves as the second body having the through hole 450, is driven toward and away from the first plate 422. Alternatively, the position of the second plate 424 may be fixed, and the first plate 422 may be driven toward and away from the second plate 422. Further alternatively, each of the first and second plates 422, 424 may be driven toward and away from each other.

In the above six to eighth embodiments, the plates 422, 424, which serve as the first and second bodies, respectively, are used. Alternatively, in place of at least one of the first and second bodies, a slide core(s), which is driven in a direction that is angled relative to the drive direction of the plate may be used.

In the eighth embodiment, the lowest recess 622 of the rotatable body 620, which is placed in the bottom 611 of the guide hole 610, forms the end portion 450 of the through hole 450. Alternatively, the other recess 622, which is located other than the top 612 of the guide hole 610 along the outer peripheral edge of the guide hole 610, may form the end portion 451 of the through hole 450.

In the above embodiments, at least one of the components 55-59, 61-63, 71-73, 120, 132, 160, 310, 320, 330, 332, 340, 350, 360, 370, 440, 450, 451, 454, 510, 520, 610, 620 may serve as a supply means for supplying the insert 14-16, 480 into the die cavity 50, 438 in advance of injection of a molding material into the die cavity 50, 438 after initiation of the die closing drive operation of the die arrangement 40, 420.

Additional advantages and modifications will readily occur to those skilled in the art. The invention in its broader terms is therefore not limited to the specific details, representative apparatus, and illustrative examples shown and described.

What is claimed is:

1. An insert molding apparatus for molding a product having an insert embedded therein, the insert molding apparatus comprising:
   a die drive means;
   a die arrangement that is driven by the die drive means to open and close the die arrangement and includes a plurality of die bodies, wherein:
      at least two of the plurality of die bodies are engageable with one another through a die closing drive operation of the die arrangement by the die drive means and are disengageable from one another through a die opening drive operation of the die arrangement by the die drive means; and
      the at least two of the plurality of die bodies cooperate together to define a die cavity for receiving the insert and for molding the product when the at least two of the plurality of die bodies are engaged with one another; and
   a supply means for supplying the insert into the die cavity in advance of injection of a molding material into the die cavity after initiation of the die closing drive operation of the die arrangement, wherein:
   the insert is a complex insert that includes:
      a first type insert element that has a hole; and
      a second type insert element that has a journal portion, which is inserted into the hole of the first type insert element; and
   the supply means includes:
      a straight hole, which is defined by one or more of the plurality of die bodies and is communicated with the die cavity;
      a first urging means for urging the first type insert element, which is fed to the straight hole in such a manner that the hole of the first type insert element is coaxial with the straight hole, so that the first type insert element is driven to the die cavity by the first urging means; and
      a second urging means for urging the second type insert element, which is fed to the straight hole in such a manner that the journal portion of the second type insert element is coaxial with the straight hole, so that the second type insert element is driven to the die cavity by the second urging means.

2. The insert molding apparatus according to claim 1, wherein the first urging means includes a first urging member, which is received in and is slid along the straight hole.

3. The insert molding apparatus according to claim 1, wherein the first urging means urges the first type insert element, so that the first type insert element is slid along the straight hole.

4. The insert molding apparatus according to claim 1, wherein the first urging means and the second urging means are placed on a common axial side of the die cavity and respectively urge the first type insert element and the second type insert element, which are fed into the straight hole at different axial locations, respectively, with respect to the die cavity.

5. The insert molding apparatus according to claim 4, wherein:
   the first urging means includes a first urging member, which is formed into a tubular body and urges the first type insert element that has the hole penetrating therethrough; and
   the second urging means includes a second urging member, which urges the second type insert element through an interior of the first urging member coaxially received in the straight hole and also through the hole of the first type insert element.

6. The insert molding apparatus according to claim 5, wherein the second urging member slides along the interior of the first urging member.

7. The insert molding apparatus according to claim 5, wherein the second urging member urges the second type insert element in such a manner that the second type insert element is slid along the interior of the first urging member.

8. The insert molding apparatus according to claim 1, wherein:
   the straight hole includes a first hole segment and a second hole segment, which are coaxial with one another and are arranged on opposite sides, respectively, of the die cavity;
   the first urging means includes a first urging member, which urges the first type insert element fed to the first hole segment; and
   the second urging means includes a second urging member, which urges the second type insert element fed to the second hole segment.

9. The insert molding apparatus according to claim 1, further comprising an orientation control means for controlling orientation of at least one control subject insert element, which includes at least one of the first type insert element and the second type insert element fed to the straight hole.

10. The insert molding apparatus according to claim 9, wherein:
    at least one of the first urging means and the second urging means, which urges the at least one control subject insert element, includes an urging member, which has a distal end portion that engages and applies an urging force against the at least one control subject insert element; and
    the orientation control means uses the distal end portion of the urging member of the at least one of the first urging means and the second urging means to control the orientation of the at least one control subject insert element.

11. The insert molding apparatus according to claim 9, wherein:
    at least one of the first urging means and the second urging means, which urges the at least one control subject insert element, includes an urging member, which applies an urging force against the at least one control subject insert element; and
    the orientation control means includes a transferring member, which cooperates with the urging member of the at least one of the first urging means and the second urging means to clamp the at least one control subject insert element and moves in an urging direction of the urging member.

12. The insert molding apparatus according to claim 1, the supply means further includes a feed means for automatically and separately feeding the first type insert element and the second type insert element to the straight hole.

13. The insert molding apparatus according to claim 12, wherein:
    the first type insert element is one of a plurality of first type insert elements fed in the insert molding apparatus;
    the second type insert element is one of a plurality of second type insert elements fed in the insert molding apparatus;

the feed means includes:
  a first type holding hole, which has a lower end communicated with the straight hole and holds the plurality of first type insert elements in such a manner that the first type insert elements are aligned generally in a vertical direction; and
  a second type holding hole, which has a lower end communicated with the straight hole at a location spaced from the lower end of the first type holding hole and holds the plurality of second type insert elements in such a manner that the second type insert elements are aligned generally in the vertical direction.

14. The insert molding apparatus according to claim 1, wherein:
  the first urging means urges and positions the first type insert element into the die cavity; and
  the second urging means urges the second type insert element, so that the journal portion of the second type insert element is inserted in the hole of the first type insert element previously positioned in the die cavity by the first urging means.

15. The insert molding apparatus according to claim 1, wherein:
  the second urging means urges and positions the second type insert element into the die cavity; and
  the first urging means urges the first type insert element, so that the hole of the first type insert element receives the journal portion of the second type insert element previously positioned in the die cavity by the second urging means.

16. An insert molding apparatus for molding a product having an insert embedded therein, the insert molding apparatus comprising:
  a die drive means;
  a die arrangement that is driven by the die drive means to open and close the die arrangement and includes a plurality of die bodies, wherein:
    at least two of the plurality of die bodies are engageable with one another through a die closing drive operation of the die arrangement by the die drive means and are disengageable from one another through a die opening drive operation of the die arrangement by the die drive means; and
    the at least two of the plurality of die bodies cooperate together to define a die cavity for receiving the insert and for molding the product when the at least two of the plurality of die bodies are engaged with one another; and
  a supply means for supplying the insert into the die cavity in advance of injection of a molding material into the die cavity after initiation of the die closing drive operation of the die arrangement, wherein;
  one of the plurality of die bodies other than the at least two of the plurality of die bodies is a first die body;
  one of the at least two of the plurality of die bodies is a second die body;
  the first die body and the second die body are engageable with each other through the die closing drive operation of the die arrangement and are disengageable from each other through the die opening drive operation of the die arrangement;
  the supply means includes:
    a through hole, which extends through the second die body in a relative moving direction of the first die body relative to the second die body and communicates between the die cavity and a die engaging surface of the second die body, which engages a die engaging surface of the first die body upon the die closing drive operation of the die arrangement; and
    a pusher, which protrudes from the die engaging surface of the first die body toward the second die body and ureas the insert fed into the through hole of the second die body to the die cavity in the die closing drive operation of the die arrangement;
  the supply means further includes a feed means for automatically feeding the insert to the through hole of the second die body;
  the insert is one of a plurality of inserts fed in the insert molding apparatus;
  the feed means includes:
    a holding means for holding the plurality of inserts in such a manner that the inserts are aligned one after another; and
    a guide means for guiding an end one of the plurality of aligned inserts to a feed position in the through hole of the second die body;
  the holding means includes a receiving hole, which receives the plurality of inserts in such a manner that the inserts are aligned generally in a vertical direction; and
  the guide means includes a movable body, which has a recess on a top of the movable body for receiving the end one of the plurality of aligned inserts and is reciprocably movable generally in a horizontal direction, which is generally perpendicular to the vertical direction and is also generally perpendicular to the relative moving direction of the first die body, to place the recess between the feed position and a position, which is immediately below the receiving hole.

17. An insert molding apparatus for molding a product having an insert embedded therein, the insert molding apparatus comprising:
  a die drive means;
  a die arrangement that is driven by the die drive means to open and close the die arrangement and includes a plurality of die bodies, wherein:
    at least two of the plurality of die bodies are engageable with one another through a die closing drive operation of the die arrangement by the die drive means and are disengageable from one another through a die opening drive operation of the die arrangement by the die drive means; and
    the at least two of the plurality of die bodies cooperate together to define a die cavity for receiving the insert and for molding the product when the at least two of the plurality of die bodies are engaged with one another; and
  a supply means for supplying the insert into the die cavity in advance of injection of a molding material into the die cavity after initiation of the die closing drive operation of the die arrangement, wherein;
  one of the plurality of die bodies other than the at least two of the plurality of die bodies is a first die body;
  one of the at least two of the plurality of die bodies is a second die body;
  the first die body and the second die body are engageable with each other through the die closing drive operation of the die arrangement and are disengageable from each other through the die opening drive operation of the die arrangement;
  the supply means includes:
    a through hole, which extends through the second die body in a relative moving direction of the first die body relative to the second die body and communicates between the die cavity and a die engaging surface of the second die body, which engages a die engaging surface of the first die body upon the die closing drive operation of the die arrangement; and a pusher, which protrudes from the die engaging surface of the first die body toward the second die body and urges the insert fed into the through hole of the second die body to the die cavity in the die closing drive operation of the die arrangement;

the supply means further includes a feed means for automatically feeding the insert to the through hole of the second die body;

the insert is one of a plurality of inserts fed in the insert molding apparatus;

the feed means includes:

a holding means for holding the plurality of inserts in such a manner that the inserts are aligned one after another; and a guide means for guiding an end one of the plurality of aligned inserts to a feed position in the through hole of the second die body;

the holding means includes a receiving hole, which receives the plurality of inserts in such a manner that the inserts are aligned generally in a vertical direction;

the guide means includes a rotatable body, which has a recess on an outer peripheral side of the rotatable body for receiving the end one of the plurality of aligned inserts; and the rotatable body is intermittently rotatable about a generally horizontally extending rotational axis to place the recess between the feed position and a position, which is immediately below the receiving hole.

18. An insert molding method for molding a product having an insert embedded therein, the insert molding method comprising:

supplying the insert into a die cavity of a die arrangement after initiation of a die closing drive operation of the die arrangement; and injecting a molding material into the die cavity after completion of the die closing drive operation of the die arrangement, wherein the supplying of the insert into the die cavity includes:

urging a first type insert element of the insert by a first urging means, so that the first type insert element is positioned in the die cavity; and urging a second type insert element of the insert by a second urging means, so that a journal portion of the second type insert element is inserted into a hole of the first type insert element previously positioned in the die cavity by the first urging means.

19. An insert molding method for molding a product having an insert embedded therein, the insert molding method comprising:

supplying the insert into a die cavity of a die arrangement after initiation of a die closing drive operation of the die arrangement; and injecting a molding material into the die cavity after completion of the die closing drive operation of the die arrangement, wherein the supplying of the insert into the die cavity includes:

urging a second type insert element of the insert by a second urging means, so that the second type insert element is positioned in the die cavity; and urging a first type insert element of the insert by a first urging means, so that a hole of the first type insert element receives a journal portion of the second type insert element previously positioned in the die cavity by the second urging means.

* * * * *